(12) United States Patent
Corrigan et al.

(10) Patent No.: US 6,447,250 B1
(45) Date of Patent: Sep. 10, 2002

(54) NON-INTEGRAL FAN PLATFORM

(75) Inventors: Sean Joel Corrigan, Fairfield, OH (US); Jeffrey Clayton Potter, Holland, MI (US); Joseph Timothy Stevenson, Amelia, OH (US); Jay L. Cornell, Hamilton, OH (US); James Michael Forrester, Springboro, OH (US); Rolf Robert Hetico, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/723,108

(22) Filed: Nov. 27, 2000

(51) Int. Cl.⁷ .................................................. F01D 5/22
(52) U.S. Cl. .............................. 416/193 A; 416/219 R; 416/245 R; 416/248
(58) Field of Search ............................... 416/94, 193 A, 416/219 R, 220 R, 243, 248, 245 R

(56) References Cited

U.S. PATENT DOCUMENTS

| | | | |
|---|---|---|---|
| 3,801,222 A | * | 4/1974 | Violette ....................... 416/220 |
| 4,019,832 A | | 4/1977 | Salemme et al. |
| 4,265,595 A | | 5/1981 | Bucy Jr. et al. |
| 4,393,650 A | | 7/1983 | Pool |
| 5,049,035 A | * | 9/1991 | Marlin ..................... 416/193 A |
| 5,067,877 A | | 11/1991 | Youssef |
| 5,123,813 A | | 6/1992 | Przytulski et al. |
| 5,141,401 A | | 8/1992 | Juenger et al. |
| 5,161,949 A | * | 11/1992 | Brioude et al. .......... 416/193 A |
| 5,182,906 A | | 2/1993 | Gilchrist et al. |
| 5,193,982 A | * | 3/1993 | Inizan et al. ............. 416/193 A |
| 5,197,857 A | | 3/1993 | Glynn et al. |
| 5,213,475 A | | 5/1993 | Peterson et al. |
| 5,222,865 A | | 6/1993 | Corsmeier |
| 5,281,096 A | | 1/1994 | Harris et al. |
| 5,282,720 A | | 1/1994 | Szpunar |
| 5,350,279 A | | 9/1994 | Prentice et al. |
| 4,483,661 A | | 11/1994 | Manharth |
| 5,466,125 A | * | 11/1995 | Knott ....................... 416/193 A |
| 6,033,185 A | | 3/2000 | Lammas et al. |

OTHER PUBLICATIONS

"Fan And Booster Assembly –Descrption And Operation", CFM International, CFM56, Engine Shop Manual, 5 pages.
"Fan And Booster Module –Installation", CFM International, CFM56, Engine Shop Manual, 8 pages.
"CFM56–7B Line Maintenance Traning Manual", CFM The Power of Flight, Jan. 2000 –Revision 3, 16 pages.
Misc. Drawings from GE online Parts List, 5 pages.

* cited by examiner

Primary Examiner—Edward K. Look
Assistant Examiner—Ninh Nguyen
(74) Attorney, Agent, or Firm—Nathan D. Herkamp; Steven J. Rosen

(57) ABSTRACT

A gas turbine engine rotor disk has a number of annular hubs circumscribed about a centerline and each of the hubs is connected to a disk rim by a web. A plurality of circumferentially spaced apart circular arc dovetail slots are disposed through the rim. Circumferentially extending annular burst slots extend radially through the rim into the dovetail slots between each adjacent pair of the webs. The fan blades have circular arc dovetail roots disposed within the circumferentially spaced apart circular arc dovetail slots. A one piece spinner attached to a forward extension of the disk at a location between a tip and an axially aft spinner end of the spinner. Non-integral platforms circumferentially disposed between the fan blades. A booster spool is connected to the rotor disk by a mounting plate therebetween and the platforms are radially retained to the disk and mounting plates by pins through holes in mounting lugs depending radially inwardly from the platforms. Pairs of circumferentially oppositely facing retaining slots have retainers disposed therein which extend across the dovetail slots to axially retain the dovetail roots in the dovetail slots.

24 Claims, 16 Drawing Sheets

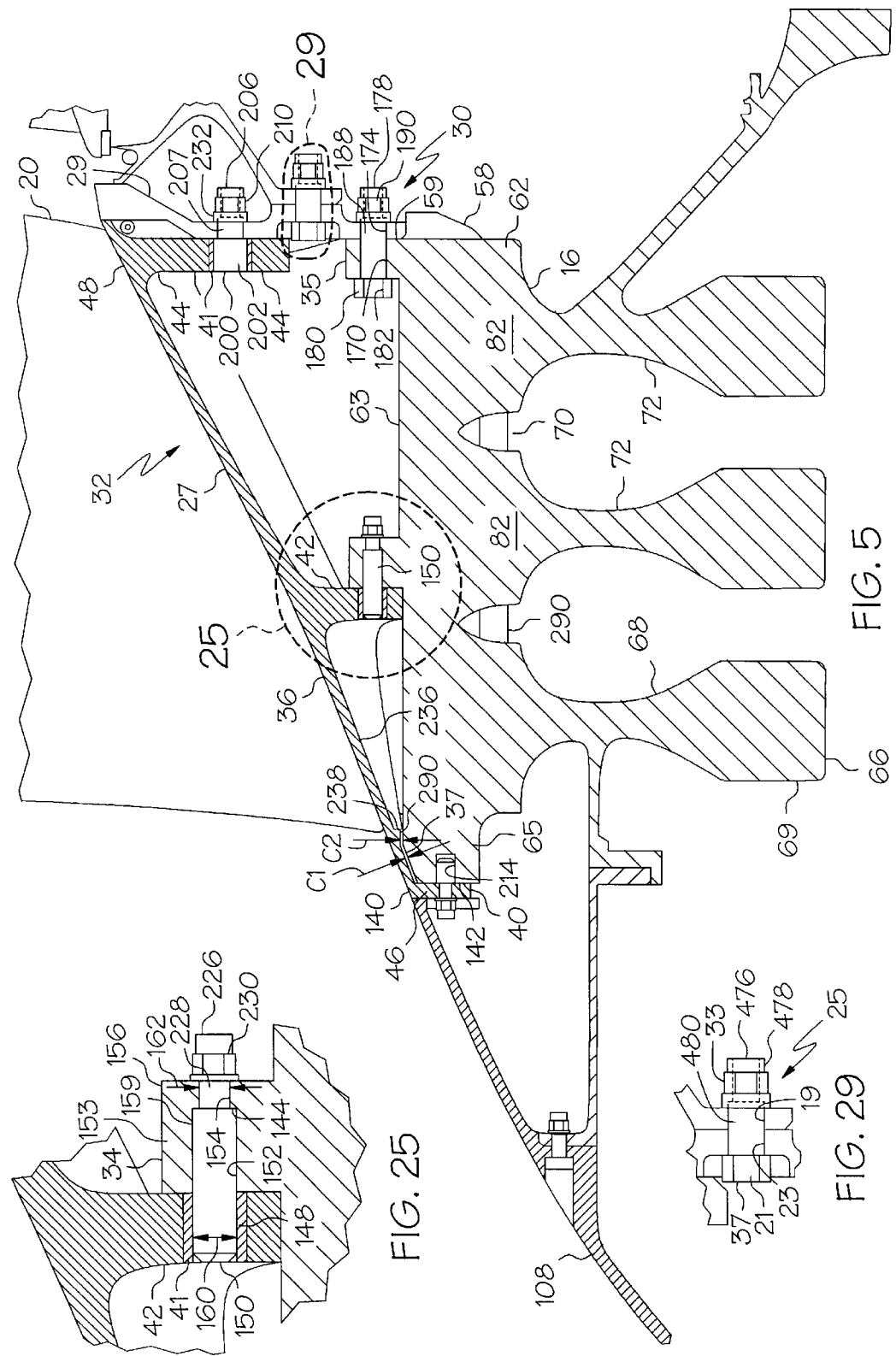

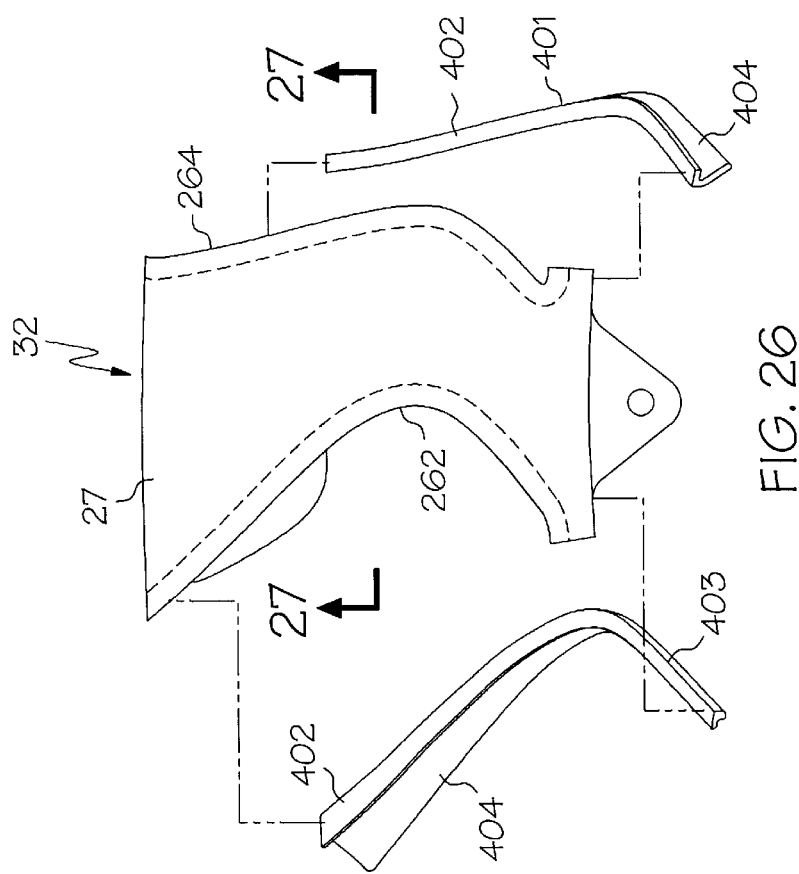
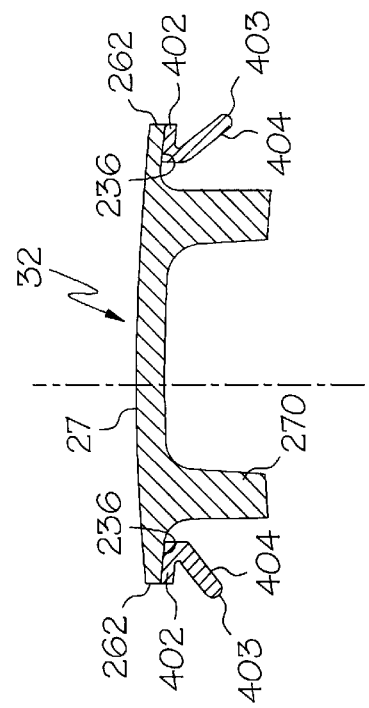

NON-INTEGRAL FAN PLATFORM

BACKGROUND OF THE INVENTION

1. Field of the Invention

The present invention relates generally to non-integral fan platforms for gas turbine engine fan assemblies and, more specifically, to such platforms and a fan assembly having fan blades with circular arc dovetail roots that mate in circular arc dovetail slots in a disk of a fan rotor.

2. Discussion of the Background Art

A turbofan gas turbine engine used for powering an aircraft in flight includes a fan assembly having a plurality of circumferentially spaced apart fan blades extending radially outwardly from a rotor disk. Ambient airflow is channeled between the blades and pressurized thereby for generating thrust for powering the aircraft in flight. The fan assembly typically includes a plurality of circumferentially spaced apart fan blades each having a dovetail root disposed in a complementary, axially extending dovetail groove or slot in a perimeter or rim of a rotor disk. The dovetail grooves are defined by dovetail posts and are complementary in configuration with the blade dovetail roots for radially retaining the blades to the rotor disk. The blades are also axially retained in the rotor disk to prevent axial movement of the blades in the upstream and downstream directions. A spinner is mounted to a front end of the fan assembly to provide smooth airflow into the fan.

A radially inner flowpath boundary for the airflow channeled between the blades is provided typically by integral or non-integral platforms at the blade roots which circumferentially abut each other between adjacent fan blades. There are often reasons for increasing the airflow through the fan blades to increase the thrust without increasing or holding to a limit of a tip of the fan blade. An inner flowpath boundary, often referred to as the hub, is moved radially inwardly from an existing engine design or the engine is originally designed to have, what is referred to as, a low radius hub. Conventionally, a radial transition portion is a transition from a curved blade section at the flowpath to a straight shank at the top of the dovetail. Due to the low inner diameter of the flow path, the radial transition portion of the fan blade from the aerodynamic or curved portion of the blade to the dovetail root is significantly shortened. It is desirable to have a fan disk assembly for a low radius hub design which incorporates a circular arc dovetail root and slot to ensure an adequate footprint and load path into the disk. The circular arc dovetail is arc shaped as disclosed in U.S. Pat. No. 5,123,813 which discloses circular arc dovetail slots and roots having centerlines in the form of arcs of a circle when viewing the disk radially.

It is desirable to have a platform that incorporates features to help provide a low radius hub design which incorporates a circular arc dovetail root and slot. Deflection of the platform is conventionally prevented by generally axially extending stiffening features such as rails. These rails interfere with the disk at the forward edge of the platform and cause the radial height of the platform to be increased at the forward end, which is contrary to the design objectives of the low radius hub.

SUMMARY OF THE INVENTION

A non-integral gas turbine engine fan blade platform for circumferential disposition between fan blades, the platform includes a platform wall with a radially outer surface which faces radially outwardly and a radially inner surface which faces radially inwardly. The platform wall is sloped with respect to a centerline with an increasing radius of the outer surface in the axially aft direction. Forward, mid, and aft mounting lugs depend radially inwardly from the platform wall, a wedge shaped platform bumper depends radially inwardly from the inner surface of the platform wall, and the wedge is axially located forward of the mid mounting lug. Circumferentially curved forward stiffening ribs extend axially from the mid mounting lug to a forward edge of the platform bumper about where the platform bumper begins to depend radially inwardly from the inner surface of the platform wall.

An exemplary embodiment of the invention further has the forward stiffening ribs tapered down to the inner surface of the platform such that at any axial location, a first height of the forward stiffening ribs is less than a second height of the platform bumper along an axially extending bumper length. Circumferentially curved aft stiffening ribs extend between the mid and aft mounting lugs. The platform wall further includes a rectangularly shaped forward portion and a circumferentially curved aft portion. The circumferentially curved aft portion has pressure and suction side edges that have pressure and suction side airfoil shapes, respectively.

The mid and aft mounting lugs have axially extending mid and aft holes respectively therethrough, bushings disposed within the mid and aft holes, and the bushings are made of a harder material than that of the lugs. The bushings are pressed into the holes with an interference on the order of 1.5–2.5 mils on diameter.

BRIEF DESCRIPTION OF THE DRAWINGS

The novel features believed characteristic of the present invention are set forth and differentiated in the claims. The invention is more particularly described in conjunction with the accompanying drawings in which:

FIG. 5 is a cross-sectional view illustration of the fan disk rotor illustrated in FIG. 2 mounted to a booster rotor section of the forward section of the turbofan gas turbine engine illustrated in FIG. 1.

FIG. 25 is an enlargement of the portion of the of the fan disk within the phantom line circle in FIG. 5.

FIG. 26 is an exploded perspective view illustration of seals on the fan platform illustrated in FIG. 20.

FIG. 27 is a cross-sectional view illustration of the platform through line 27–27 in FIG. 26.

DETAILED DESCRIPTION

Figure 1:
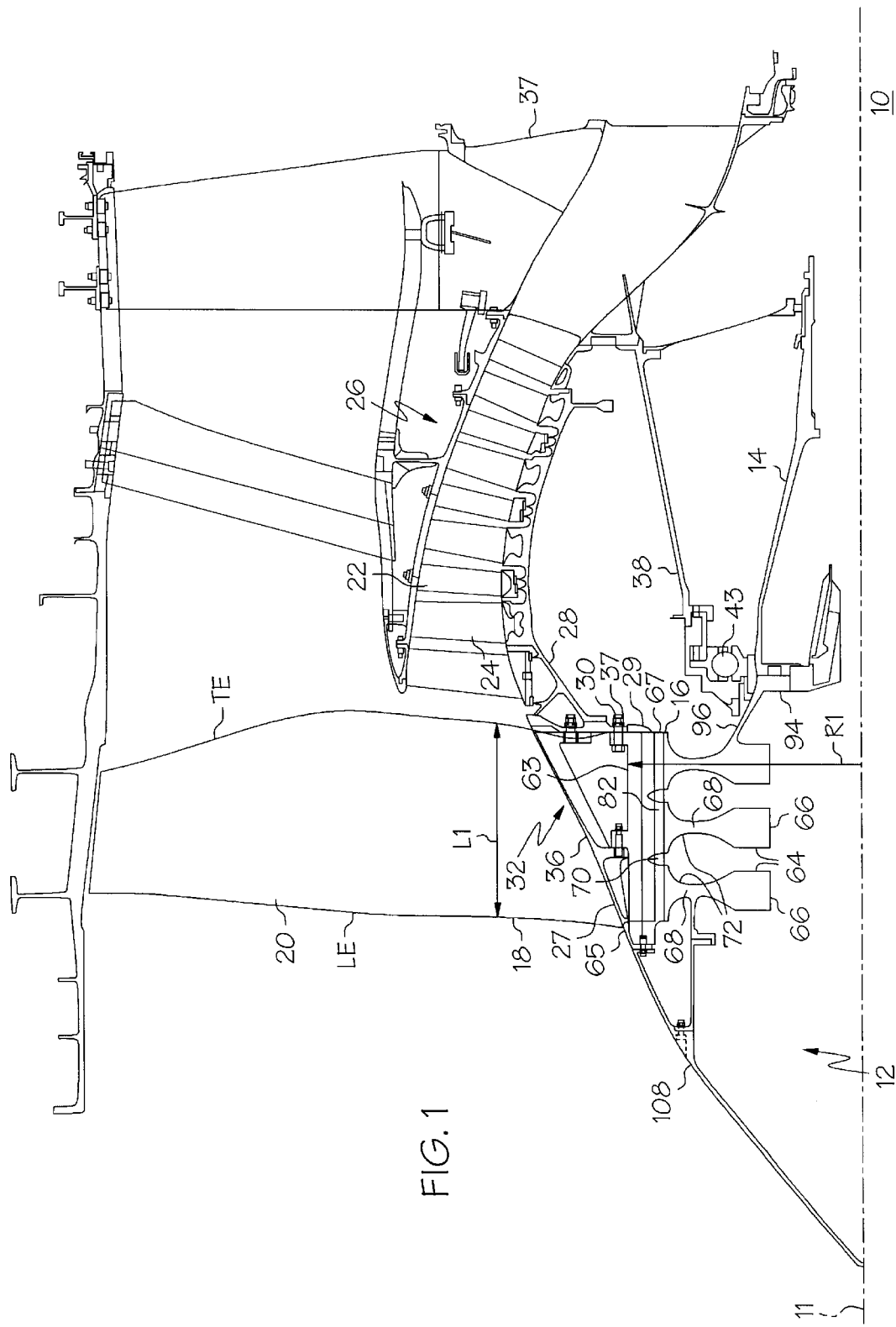
FIG. 1 is a cross-sectional view illustration of a forward section of a turbofan gas turbine engine, partly in section, illustrating an exemplary fan assembly of the present invention.

Illustrated schematically in FIG. 1 is a forward portion of an aircraft turbofan gas turbine engine 10 including an exemplary embodiment of a rotor assembly of the present invention in the form of a fan assembly 12 which is rotated by a fan drive shaft 14 powered by a low pressure turbine (not shown). The fan assembly 12 includes a fan rotor disk 16 from which extends radially outwardly a single axially located row 18 of circumferentially spaced apart fan blades 20. Disposed downstream of the fan assembly 12 is a conventional booster compressor 26 having axially spaced apart rows of booster vanes 22 and rows of booster blades 24 mounted on a rotatable booster spool 28. Further referring to FIGS. 5 and 29, an annular mounting plate 29 has annular pluralities of radially inner apertures 174, radially outer apertures 208, and radially mid apertures 23 radially located between the radially inner apertures and outer apertures. The annular mounting plate 29 is bolted or otherwise fixedly connected to the booster spool 28 with a plurality of plate bolt assemblies 25. Each of the plate bolt assemblies 25 has a carriage bolt 37 disposed through one of the mid apertures 23 and one of a plurality of spool apertures 19 in the booster spool 28. Each of the carriage bolts 37 has a bolt head 21 engaging the mounting plate 29 and attached to a shank 476 with a threaded free end 478 and a smooth portion 480 between the bolt head 21 and the free end 478. The smooth portion extends through the mid aperture 23 and the spool aperture 19. The carriage bolt 37 is secured by a countersunk nut 33 screwed onto the free end 278 to connect the booster spool 28 to the plate 29. Interference fits between the countersunk nuts 33 and the mounting plate 29 holds the nuts in place when the bolt heads 21 are torqued to tighten the plate bolt assemblies 25.

Figure 17:
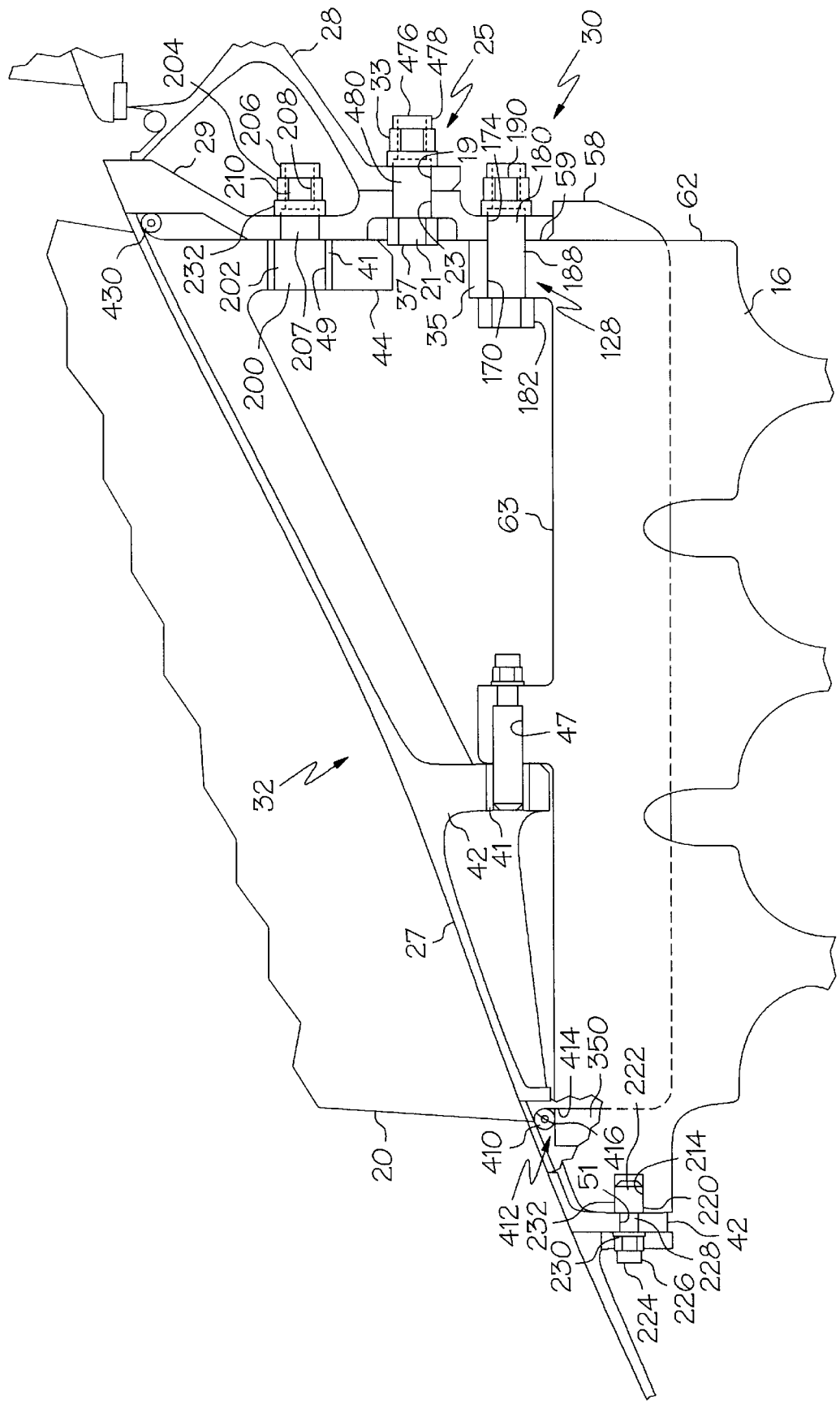
FIG. 17 is a cross-sectional view illustration of forward seal and aft seals in the fan disk in FIG. 1.

The mounting plate 29 is fixedly connected to the rotor disk 16 by a plurality of inner bolt assemblies 30 as shown in more particularity in FIGS. 5 and 17. Thus, the booster spool 28 is connected to the rotor disk 16 via the mounting plate 29 and the mounting plate is considered part of the booster spool. The booster spool and the fan disk are rotated by a turbine (not shown) through the fan drive shaft 14. The fan drive shaft 14 is rotatably supported within static structure or frame 38 of the engine by a thrust bearing 43.

Figure 2:
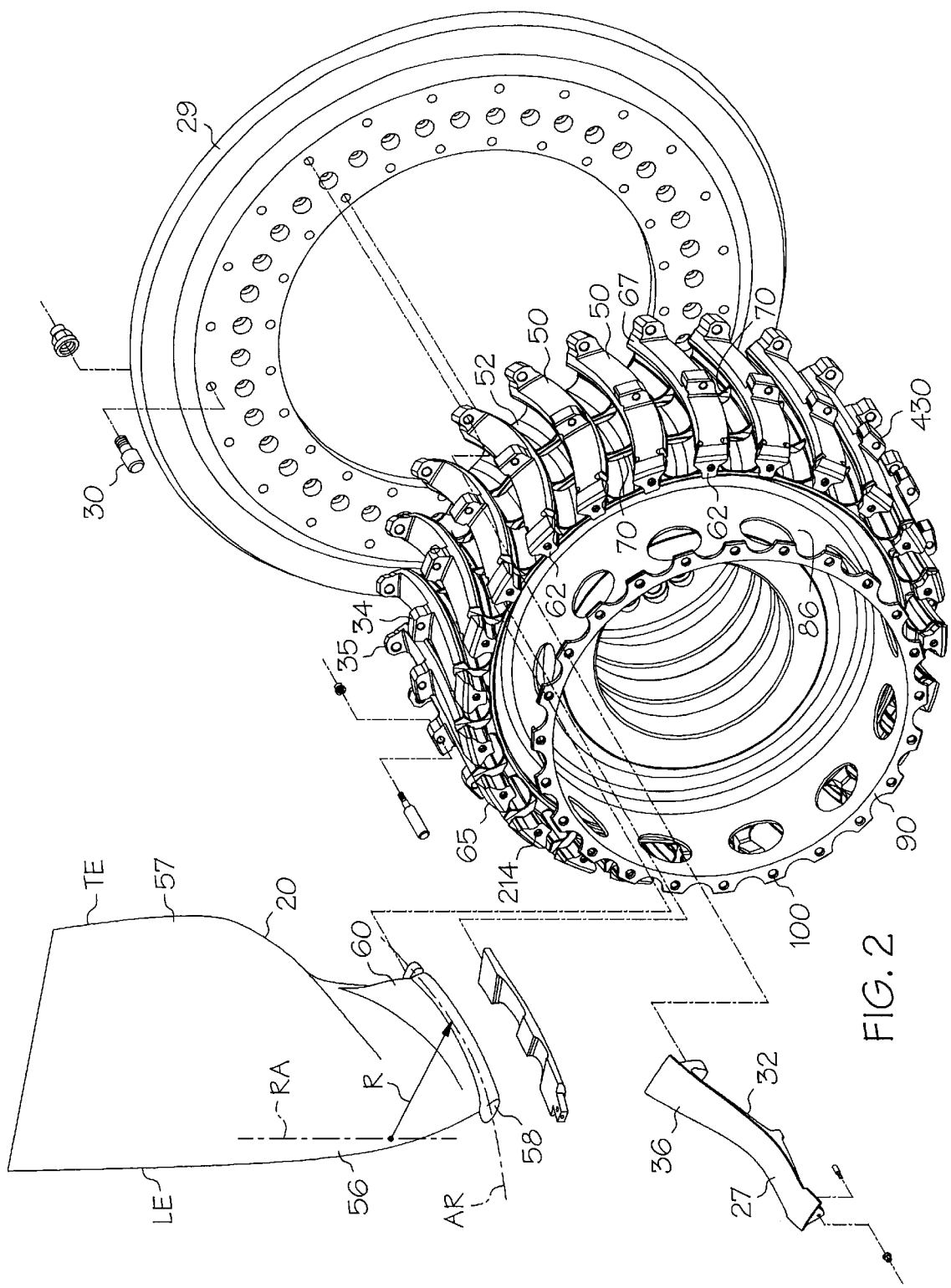
FIG. 2 is an exploded perspective view illustration of a fan rotor in the fan assembly illustrated in FIG. 1.
Figure 3:
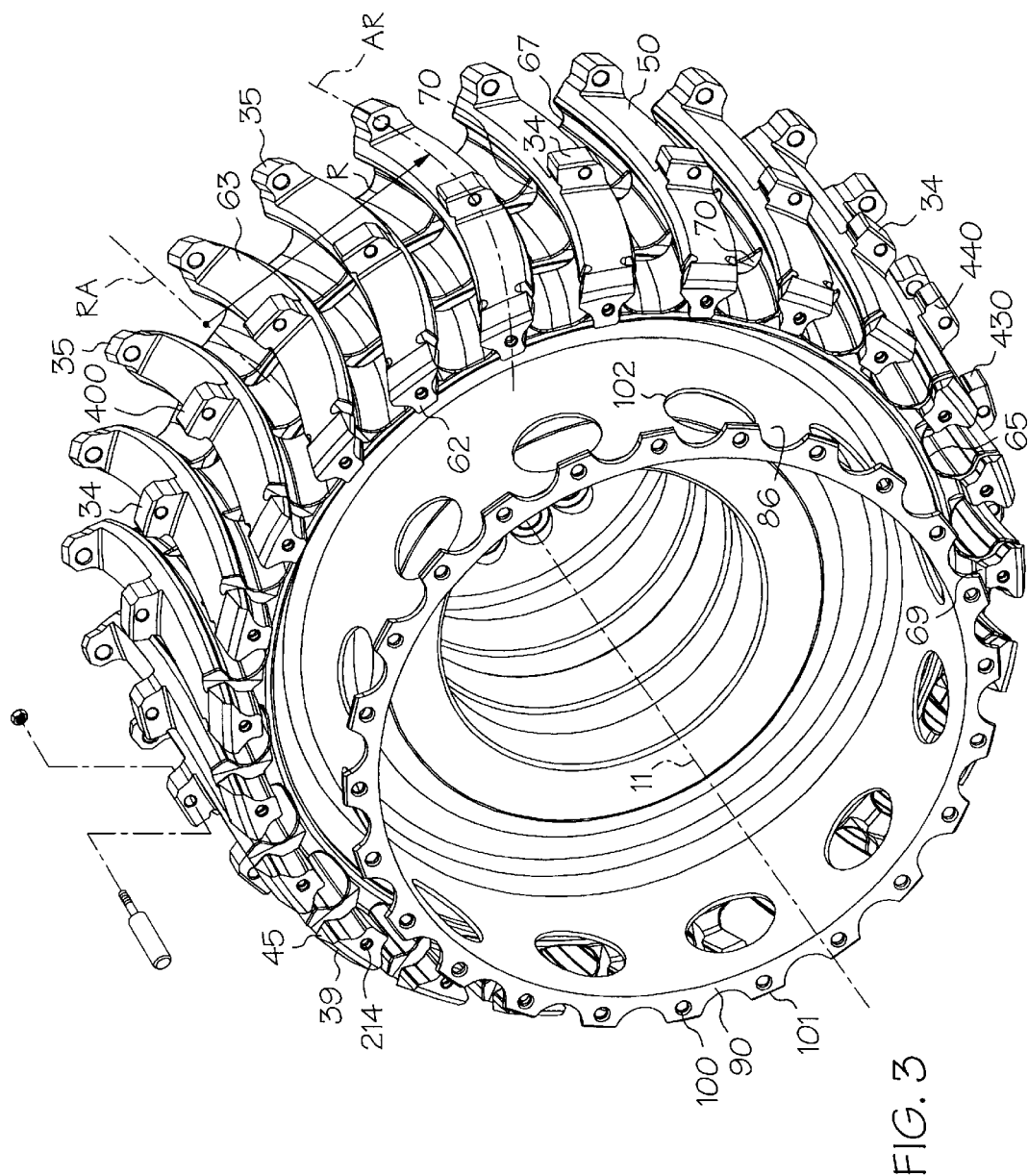
FIG. 3 is a perspective view illustration of a fan disk in FIG. 1.
Figure 4:
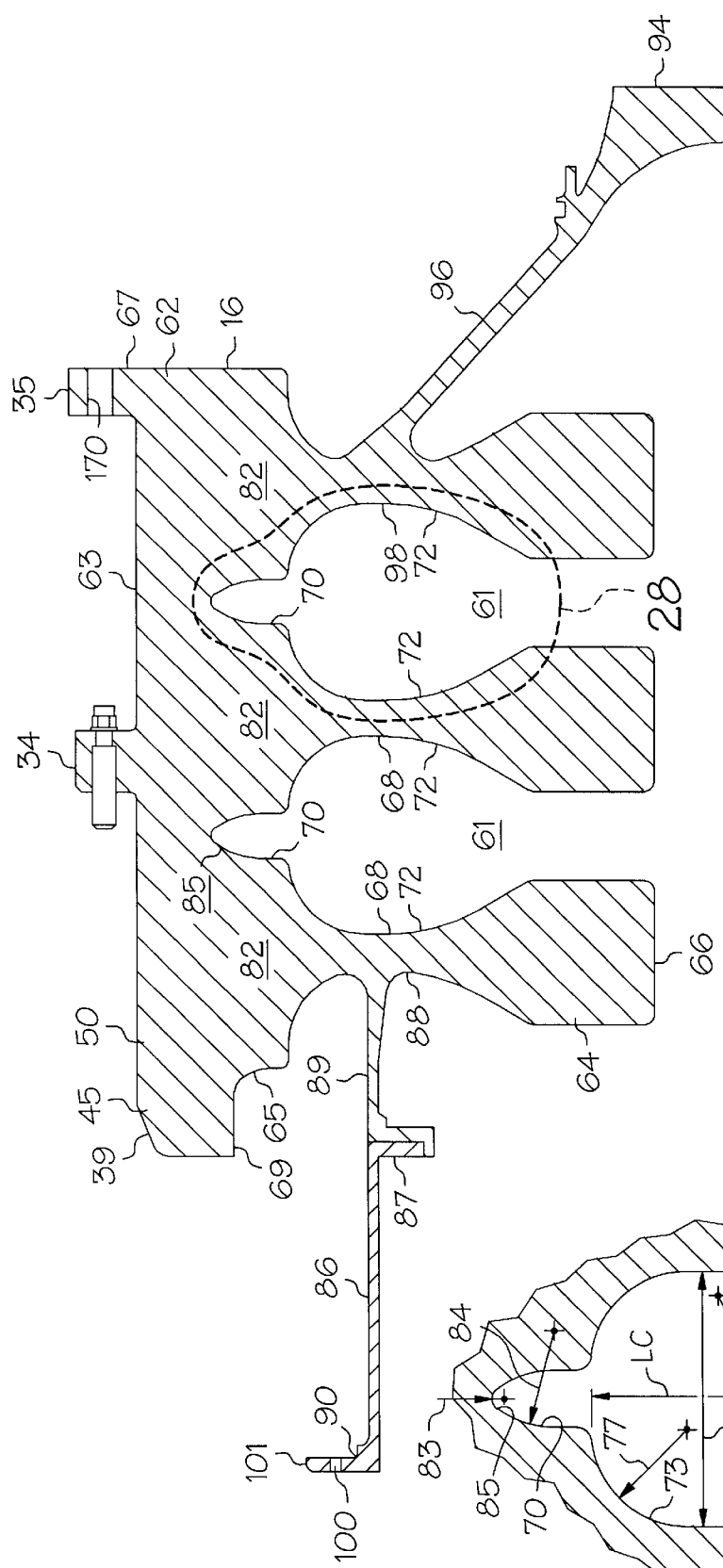
FIG. 4 is an enlarged cross-sectional view illustration of the fan disk in FIG. 3.
Figure 28:
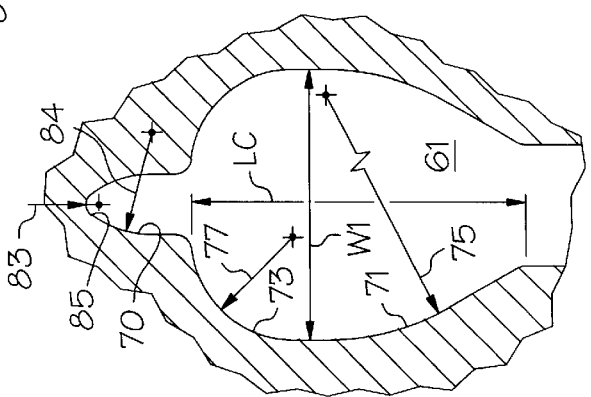
FIG. 28 is an enlargement of the portion of the fan disk within the phantom line circle in FIG. 4.

Referring further to FIGS. 2 and 3, each of the fan blades 20 has a curved airfoil section 56 with pressure and suction sides 55 and 57, respectively, extending between airfoil leading and trailing edges LE and TE, respectively. The airfoil section 56 is attached to a circular arc dovetail root 58 and a transition section 60 of the fan blade 20 extends between the airfoil section and the root. Referring further to FIG. 4, the fan rotor disk 16 is a multi-bore disk having a rim 62 attached to a number of disk hubs 64 with bores 66 by a corresponding number of webs 68 circumscribed about the centerline 11. Web channels 61 extend axially between the webs 68 and radially between the rim 62 and the hubs 64.

Three identical hubs are used in the exemplary embodiment of the invention illustrated herein a different number of hubs may be used such as 2 or 4 or more. The disk of the invention is not limited to identical hubs, webs, and bores. The hubs, webs, and bores can have different radial and axial dimensions. Because the fan blade 20 has a long axial length L relative to an outer diameter of the disk 16, noted by a radial distance R1 from a disk outer surface 63 to the engine centerline 11, a multi-bore disk is more efficient than the traditional single bore disk due to its lighter weight. The multi-bore disk of the present invention may also be used in other parts of the engine such as in a compressor or turbine.

Referring to FIG. 4, note that the rim 62 is radially spaced very close to the hubs 64. The web channels 61 are wide and short compared to those in conventional disks. The webs channels have relatively wide channel maximum widths W1, extending axially between the webs 68, compared to relatively short channel lengths LC extending radially between the rim 62 and the hubs 64. The channel maximum width W1 is on the same order of magnitude as the channel length LC. The web channels 61 are substantially rounded and the webs 68 have relatively large radially inner and outer fillets 71 and 73, respectively, and the inner fillet 71 extends in a range of about 30–70 percent of the channel length LC and is illustrated in the exemplary embodiment as being about 50 percent of the channel length LC. The web channels are short and wide and, in the exemplary embodiment, the webs 68 are formed substantially by the inner and outer fillets 71 and 73 which have large inner and outer radii of curvature 75 and 77, respectively. In general, the inner and outer fillets 71 and 73 form a substantial portion of the web 68. The inner fillets 71 are large and have a large inner radius of curvature 75 to avoid large stress concentrations that can build up between the hubs 64 and the webs 68.

Referring further to FIGS. 2, 3 and 4, a plurality of circumferentially spaced apart circular arc dovetail slots 52 are disposed through the rim 62 and extend circumferentially between disk posts 50, axially from a forward end 65 to an aft end 67 of the rim, and radially inwardly from the disk outer surface 63 of the rim. The circular arc dovetail slots 52 are used for receiving and radially retaining the circular arc dovetail roots 58.

The circular arc dovetail root 58, the circular arc dovetail slots 52, and the disk posts 50 are arcuate and curved normal to and about a radial axis RA. This is exemplified by an arc AR through the disk post 50 which is circumscribed about the radial axis RA at a radius of curvature R. Each of the circular arc dovetail roots 58 is designed to slide axially aftwardly along an arc into a corresponding one of a plurality circular arc dovetail slot 52 and be retained radially and circumferentially by the disk rim 62 and, more particularly, by the posts 50. Each of the posts 50 has an overhang 69 extending axially forwardly from the disk rim 62 and are located radially outwardly on the posts. In the exemplary embodiment, the disk outer surface 63 of the rim 62 is contiguous with the disk posts 50 and the overhangs 69. Though the sliding motion is circular along an arc, it is also referred to herein as an axially sliding motion.

Figure 9:
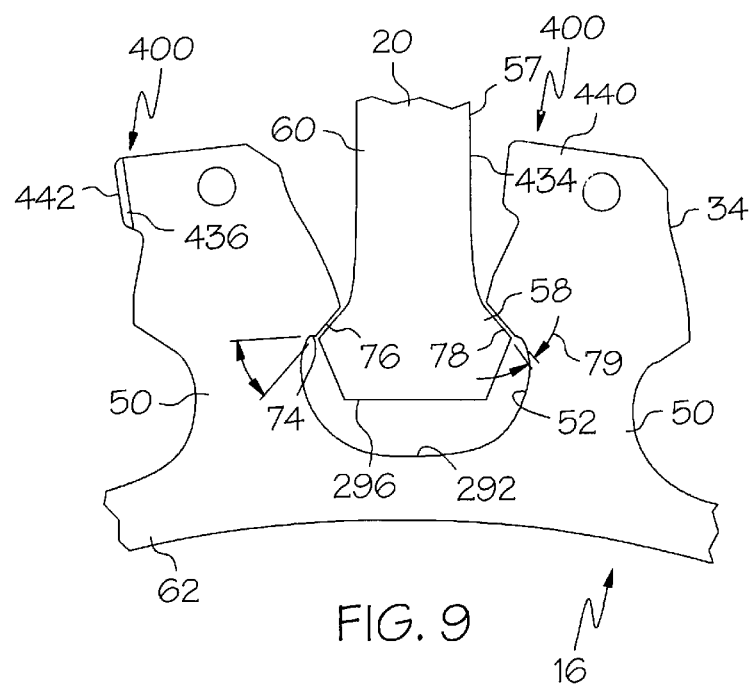
FIG. 9 is a cross-sectional view illustration of a dovetail slot in the fan disk in FIG. 3.

Referring to FIG. 9, conical undercuts 74 are formed in the disk posts 50 within and along the circular arc dovetail slot 52. The undercuts 74 extend between a conical dovetail slot pressure surface 76 on the disk post 50 and the rounded cross-sectional or toroidal portion within and along the circular arc dovetail slot 52. The conical dovetail slot pressure surface 76 is designed to contact conical a dovetail root pressure surface 78 on the circular arc dovetail root 58. The undercuts 74 are conical and, in the exemplary embodiment, are illustrated as having an undercut angle 81 with respect to the dovetail slot pressure surface 76 on the disk post 50 of about 30 degrees. The contact stresses along root in the arc of contact are high during high speed rotation of the fan blades 20 such as during acceleration of the engine and takeoff of the aircraft. The undercuts on the posts 50 help alleviate edge of contact stresses.

Referring to FIGS. 1, 4 and 5, the rim 62 has circumferentially extending annular burst slots 70 between each adjacent pair 72 of the webs 68. The burst slots 70 extend radially through the rim 62 into the dovetail slots 52 and provide crack arrestment. The burst slots 70 provide severed hoop load paths between rim portions 82 of the rim 62 from which the webs 68 depend from the rim 62 which resist crack propagation from one rim portion 82 of the disk 16 to another. In the exemplary embodiment, the burst slots 70 have a cross-section in the shape of an ogive 85 with a radially outer ogive radius 83 and a radially inner ogive radius 84 wherein the radially inner ogive radius is substantially larger.

Referring further to FIGS. 3 and 4, an annular forward extension 86 (a cylindrical annular forward extension exemplified herein) has an annular forward flange 90 and an annular aft extension flange 87. The aft extension flange 87 is bolted to an annular forward arm 89 extending forward from a forward most one 88 of the webs 68 of the disk 16. Alternate embodiments include the forward extension 86 being integrally formed or cast with and extending forward from the forward most one 88 of the webs 68 of the disk 16. An annular aft arm 96 (a conical annular aft arm exemplified herein) extends axially aftwardly from and is integrally formed or cast with an aftward most one 98 of the webs 68 of the disk 16 and has an annular aft flange 94. The annular aft flange 94 is bolted to the fan drive shaft 14 as illustrated in FIG. 1, thus, connecting the fan disk to the fan drive shaft. The forward flange 90 is scalloped having a plurality of circumferentially distributed forward bolt holes 100 through lobes 101 between scalloped out sections of the forward flange. A plurality of circumferentially distributed extension lightening holes 102 are disposed through the forward extension 86 to reduce weight of the disk 16 and fan assembly 12. The forward extension 86 is designed with sufficient flexibility and length to attenuate or accommodate differential radial growth between the disk 16 and a spinner 104.

Illustrated in FIGS. 2, 3, 4, 5, 19 and 20 are non-integral platforms 32 (separate from the fan blades 20) circumferentially disposed between the fan blades 20. Forward and aft disk lugs 34 and 35, respectively, extend radially outwardly from the posts 50 along the disk outer surface 63 of the rim 62 of the disk 16. Each of the platforms 32 has a aerodynamically contoured platform wall 27 with a radially outer surface 36 which faces radially outwardly and defines and maintains an inner fan flowpath that extends axially across the fan blade 20. A radially inner surface 236 of the platform wall 27 faces radially inwardly. The platform walls 27 are sloped with respect to the centerline 11 to provide an increasing radius of the outer surface 36 (the inner fan flowpath surface along the platform) in the axially aft direction.

A radially outer corner 45 of the disk post 50 has a flat chamfer 39 which encompasses a portion of the overhang 69 of the disk post. The platform walls 27 are angled or sloped parallel to the chamfer 39. In the exemplary embodiment illustrated herein, the platform walls 27 are parallel to and spaced apart a first clearance C1, illustrated in FIG. 5, of about 30 mils (0.03 inches) from the chamfer 39 along the radially outer corner 45 of the overhang 69 of the disk post 50. Further referring to FIG. 21, a wedge shaped platform bumper 238 depends radially inwardly from the inner surface 236 of the platform wall 27. The platform bumper 238, in the exemplary embodiment, has a flat bottom surface 240 and there is about a 50 mil second clearance C2, illustrated in FIG. 5, between the bottom surface and the inner surface and disk outer surface 63 along the post 50. The platform bumper 238, in an alternative embodiment, may have a circumferentially curved bottom surface contoured to match the circumferentially curved disk outer surface 63.

Figure 19:
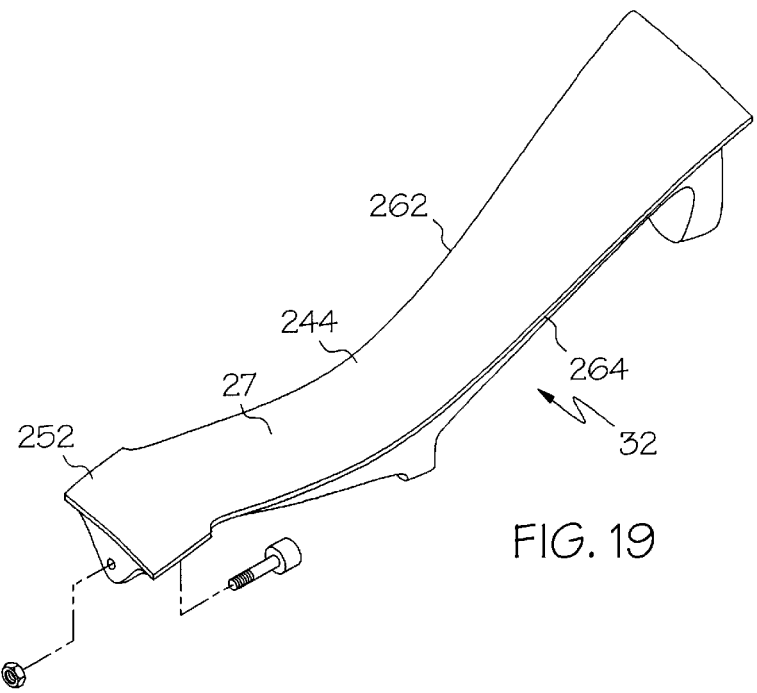
FIG. 19 is a forward looking aft perspective view illustration of a fan platform of the fan rotor illustrated in FIG. 1.
Figure 20:
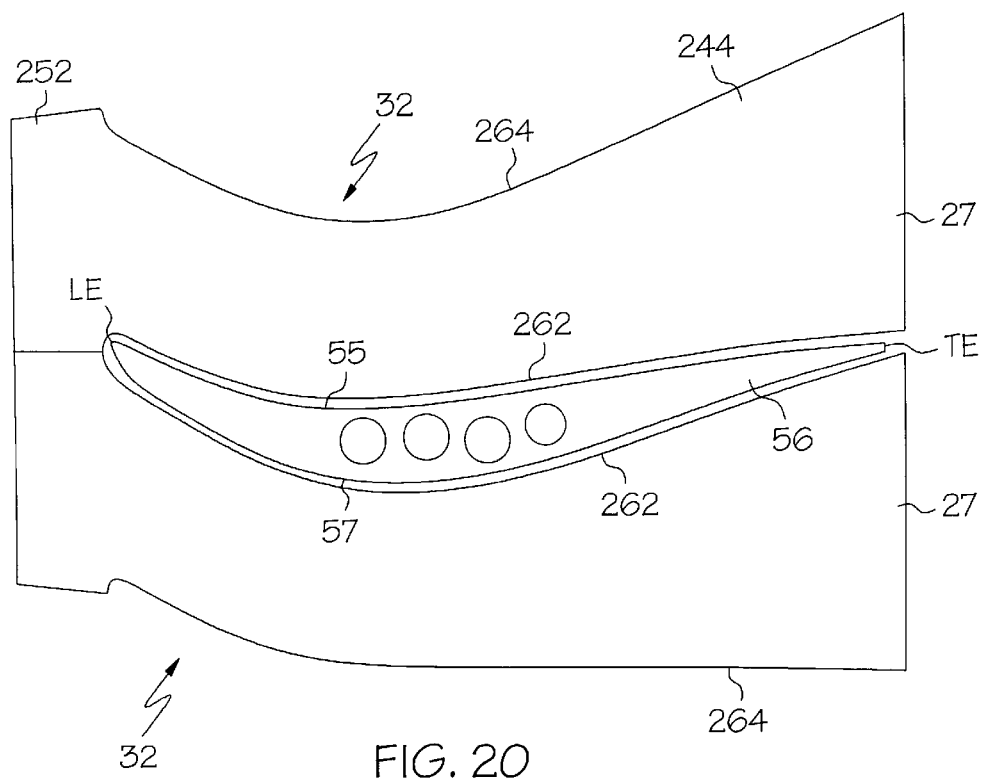
FIG. 20 is a radially inwardly looking sectional view illustration of the fan platforms assembled on the fan rotor illustrated in FIG. 1.
Figure 21:
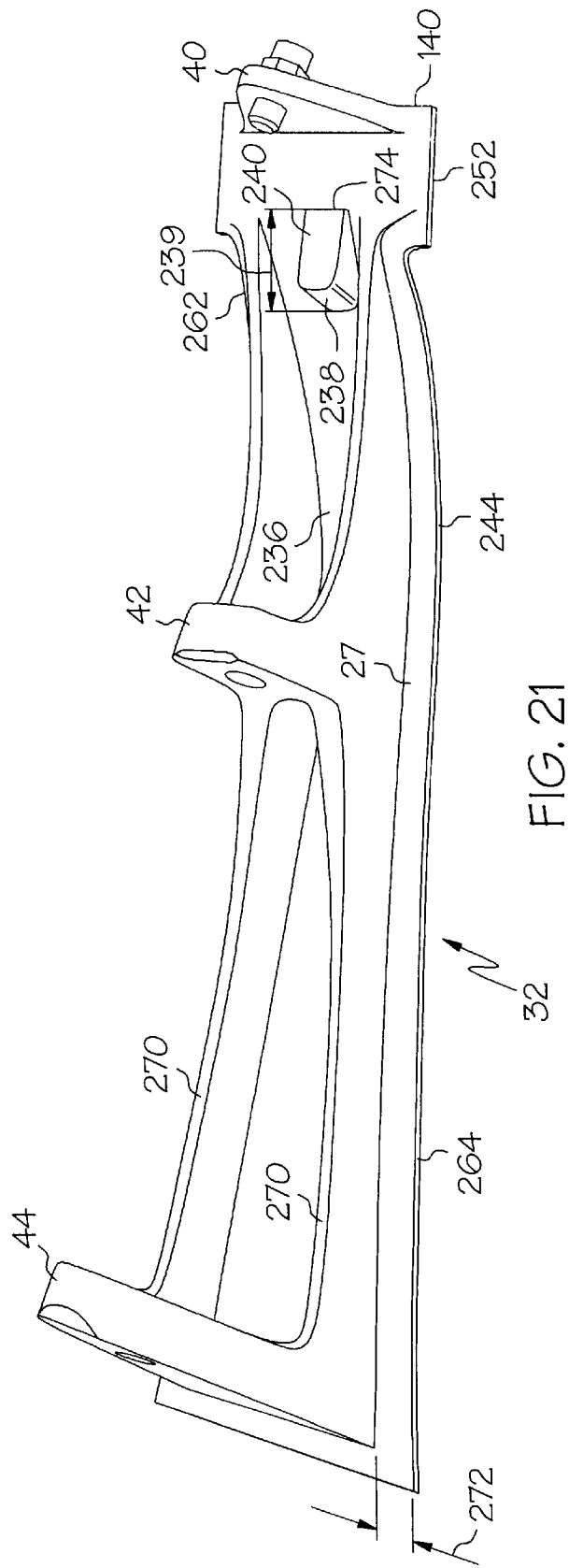
FIG. 21 is a radially outwardly looking perspective view illustration of the fan platform illustrated in FIG. 19.

Referring to FIGS. 19, 20 and 21, the platform walls 27 have a rectangularly shaped forward portion 252 and a circumferentially curved aft portion 244. The circumferentially curved aft portion 244 is contoured to fit around the curved airfoil section 56 between the airfoil leading and trailing edges LE and TE, respectively. The circumferentially curved aft portion 244 has pressure and suction side edges 262 and 264, respectively, which are shaped to conform to the pressure and suction sides 55 and 57, respectively, of the airfoil section 56.

Referring to FIGS. 5 and 17–21, each of the platforms 32 has forward, mid, and aft mounting lugs 40, 42, and 44, respectively, depending radially inwardly from the platform wall 27. The forward and aft mounting lugs 40 and 44 are located at forward and aft ends 46 and 48, respectively, of the platform walls 27 and the mid mounting lug 42 is axially located therebetween, though, not necessarily midway. The mid and aft mounting lugs 42 and 44 have axially extending mid and aft holes 47 and 49, respectively, therethrough and bushings 41 disposed within the mid and aft holes. Platform materials are typically an aluminum alloy such as 7075-T73 Aluminum, which cannot take a large bearing stress imposed on it by pins used to radially secure or retain the platforms 32 to the disk 16 when the fan is running at high speeds. The inside of the holes in the platform lugs would crush under the bearing load of the pins. Therefore, the exemplary embodiment of the present invention incorporates the press-fit bushings 41 in the mid and aft holes 47 and 49 of the platform 32. The bushings 41 are made of a harder material with the necessary bearing capability such as Inconel 718. The bushings 41 are pressed into the holes with an interference on the order of 1.5–2.5 mils on diameter. Thus, the bearing stress imparted by the pins is attenuated through the bushings and does not adversely affect the aluminum platform.

The rectangularly shaped forward portion 252 of the platform wall 27 includes a platform leading edge 140 extending axially forward just past the rim 62 and the forward mounting lug 40 depending from the forward portion 252 at the platform leading edge over and flush with a forward facing circular rim surface 142 as illustrated in FIGS. 5 and 25. A plurality of post holes 214 extend axially aftwardly into the circular rim surface 142 at the front of the rim 62. Each post hole 214 extends into a corresponding one of the disk posts 50.

Each of the forward mounting lugs 40 has a forward lug aperture 51 to support a corresponding one of a plurality of aftwardly extending platform pins 220. Each platform pin 220 has a smooth cylindrical body 222 attached to a narrower shank 224. The shank 224 has a threaded free end 226 and a smooth portion 228 between the smooth cylindrical body 222 and the free end 226. The smooth portion 228 is disposed through the forward lug aperture 51 to provide a good smooth cylindrical load bearing surface in contact with the forward mounting lug 40. The smooth portion 228 is as long as the width or thickness of the forward lug aperture 51. An internally threaded countersunk nut 230 is screwed onto the free end 226 to secure the platform pin 220 to the forward mounting lugs 40. The countersunk nut 230 has a small unthreaded portion 232 with a countersink before threads in the nut.

Referring to FIGS. 5 and 25, a deep first counterbore 152 axially extends through each of the forward disk lugs 34 up to a back wall 144 of the counterbore at an aft end 156 of the forward disk lug. A first bolt hole 154 that is co-axial with the first counterbore 152 axially extends through the back wall 144. A forward pin 150 also has a smooth cylindrical body 159 attached to a narrower shank 161 as discussed above. The shank 161 has the threaded free end 226 and a smooth portion 228 between the smooth cylindrical body 157 and the free end 226. The smooth cylindrical body 157 of the forward pin 150 is tightly disposed in the first counterbore 152. The narrower smooth portion 228 of the forward pin 150 is disposed through first bolt hole 154 that axially extends through the back wall 144 of the forward disk lugs 34. The smooth cylindrical body 159 and the first counterbore 152 have substantially the same first diameter 160, the first bolt hole 154 has a second diameter 162, and the first diameter is larger than the second diameter. An internally threaded countersunk nut 230 is screwed onto the free end 226 of the shank 161 to secure the forward pin 150 to the forward disk lug 34.

An aft aperture 170 axially extends through each of the aft disk lugs 35 and aligns with a corresponding one of the inner apertures 174 in the annular mounting plate 29. Each of the inner bolt assemblies 30 has a carriage bolt 180 disposed through the aft aperture 170 and the inner aperture 174. Each of the carriage bolts 180 has a bolt head 182 engaging the aft disk lugs 35 and attached to a shank 176 with a threaded free end 178 and a smooth portion 188 between the bolt head 182 and the free end 178. The smooth portion extends through the aft aperture 170 and the inner apertures 174. The carriage bolt 180 is secured by a countersunk nut 190 screwed onto the free end 178 to connect the aft disk lugs to the plate 29. Interference fits between the countersunk nuts 190 and the mounting plate 29 holds the nuts in place when the bolt heads 182 are torqued to tighten the inner bolt assemblies.

A plurality of forwardly extending aft pins 200 are mounted upon the annular mounting plate 29. Each aft pin 200 has a smooth cylindrical body 202 attached to a narrower shank 204. The shank 204 has a threaded free end 206 and a smooth portion 207 between the smooth cylindrical body 202 and the free end 206. The smooth cylindrical body 202 extends axially forward of the plate. The smooth portion 207 is disposed through a corresponding one of the radially outer apertures 208 in the annular mounting plate 29. An internally threaded countersunk nut 210 is screwed onto the free end 206 to secure the aft pin 200 to the annular mounting plate 29. The countersunk nut 210 has a small unthreaded portion 232 with a countersink before threads in the nut. Each of the aft pins 200 is disposed in a corresponding one of the aft holes 49 in the aft mounting lugs 44.

Referring again to FIGS. 19, 20 and 21, circumferentially curved aft stiffening ribs 270 extend between the mid and aft mounting lugs 42 and 44. The aft stiffening ribs 270 extend substantially parallel to and spaced a first distance 272 inwardly from the pressure and suction side edges 262 and 264, respectively. Circumferentially curved forward stiffening ribs 271 extend axially from the mid mounting lug 42 to a forward edge 274 of the platform bumper 238, about where the wedge shaped platform bumper 238 begins to depend radially inwardly from the inner surface 236 of the platform wall 27. The forward stiffening ribs 271 are tapered or blended down to the inner surface 236 of the platform 32, such that at any axial position, the height of the forward stiffening ribs is less than the height of the platform bumper 238 along an axially extending bumper length 239. The platform bumper 238 provides additional stiffness to control the stress and deflection of the platform 32 and platform wall 27 during ice or bird impacts in this region. The platform bumper 238 creates a load path from the thin platform wall 27 into the top of the disk post 50 and limits deflections (and thus stresses) in case of such an impact event.

Each of the platforms 32 is mounted on the disk 16 between two adjacent ones of the fan blades 20. First, two adjoining fan blades are mounted on the disk 16 by circularly sliding the dovetail roots 58 into the corresponding dovetail slots 52 until a notch 59 (see FIGS. 5 and 17) in the transition section 60 of the fan blade 20 contacts the annular mounting plate 29. Thus, the annular mounting plate 29, considered part of the rotatable booster spool 28, provides aftwardly axial retention of the fan blade 20. Then a platform 32 is mounted on the disk in between the two adjacent mounted fan blades 20 by circumferentially aligning the platform pin 220, the forward pin 150, and the aft pin 200 with the corresponding post holes 214 and bushings 41 in the mid and aft holes 47 and 49, respectively, and sliding the platform axially aftwardly such that the pins are inserted into their corresponding holes and bushings. This essentially forms a pin and clevis means for radially and circumferentially retaining the platform 32 to the disk 16, the plate 29, and the booster spool 28.

Figure 12:
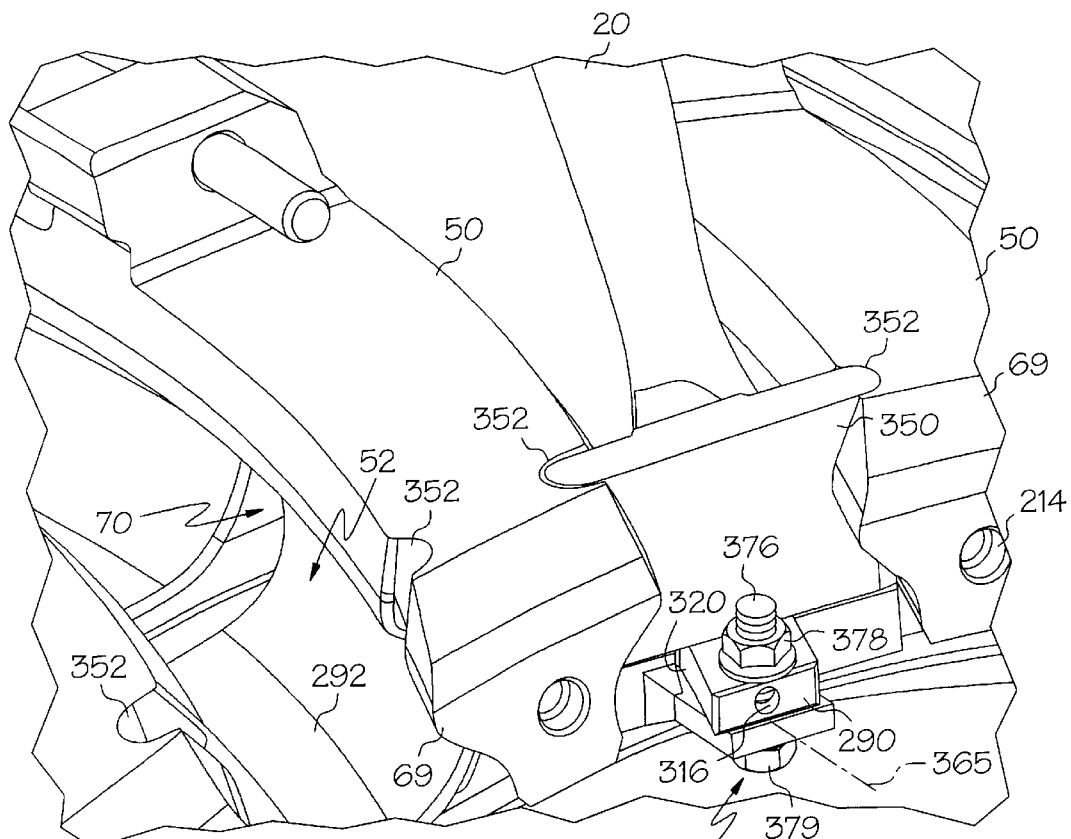
FIG. 12 is an enlarged perspective view illustration of a forward portion of the fan disk in FIG. 10.
Figure 13:
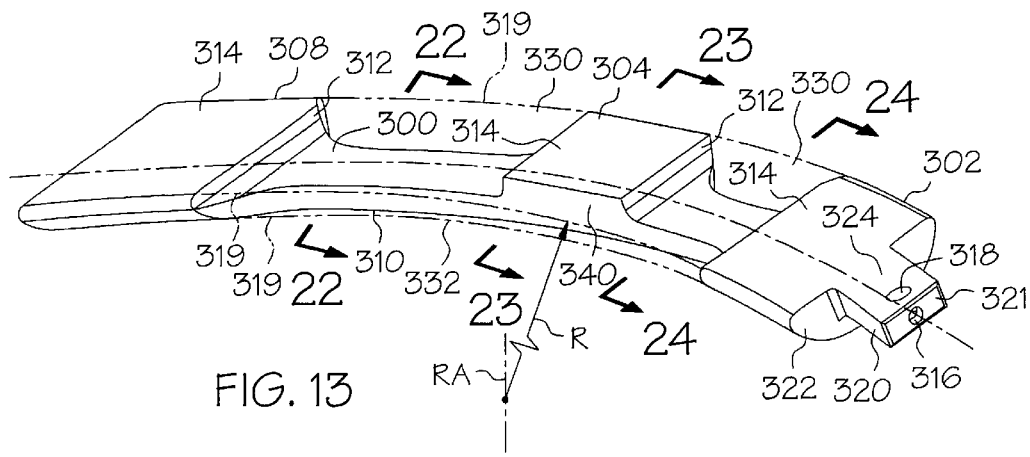
FIG. 13 is a perspective view illustration of a spacer in the dovetail slot of the fan disk in FIG. 10.
Figure 22:
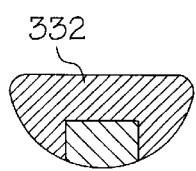
FIG. 22 is a cross-sectional view illustration of the spacer through line 22–22 in FIG. 13.
Figure 23:
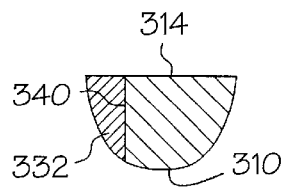
FIG. 23 is a cross-sectional view illustration of the spacer through line 23–23 in FIG. 13.
Figure 24:
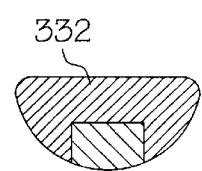
FIG. 24 is a cross-sectional view illustration of the spacer through line 24–24 in FIG. 13.

Referring to FIGS. 9, 12 and 13, a circular arc shaped spacer 290 is disposed within each of the dovetail slots 52 between a dovetail slot bottom wall 292, between the disk posts 50, and an axially extending root bottom surface 296 of the fan blade dovetail root 58 for exerting a radially outwardly directed force or pre-load upon the blade dovetail root in order to limit relative motion between the rotor blade and the rotor disk. The spacer 290 includes a backbone 300 with forward, mid and aft dovetail lands 302, 304 and 308, respectively, disposed along backbone. The backbone 300 and the forward, mid, and aft dovetail lands 302, 304 and 308, respectively, have bottom curved backbone surfaces 310 continuous and co-extensive with the dovetail slot bottom wall 292. Each of the forward, mid and aft dovetail lands 302, 304 and 308 has a riser 312 that extends radially above the backbone 300 and has a flat top 314. A spacer tab 320 extends generally axially forward of the forward land 302 and includes intersecting axially and radially extending tab apertures 316 and 318, respectively. The spacer tab 320 has a rectangular cross-section 321 and extends out of forward face 322 of the forward land 302. The spacer tab 320 also has a flat top 324 that is co-planar with the flat tops 314 of the risers 312 of each land. The spacer's backbone 300, and forward, mid and aft dovetail lands 302, 304 and 308, and the spacer tab 320 are curved along a circular arc normal to and about the radial axis RA extending radially from the engine centerline 11. In the exemplary embodiment, the spacer tab 320 is curved along a circular arc normal as described above, in alternative embodiments, it can be at an angle or straight as it extends out of forward face 322 of the forward land 302. The mid dovetail land 304 has a spacer undercut 340, about 6 degrees in the exemplary embodiment illustrated herein and other angles may be used, to allow up to 6 degrees of controlled rotation to the blade. Once the mid dovetail land 304 of the spacer contacts the dovetail slot bottom wall 292, the blade is then limited in circumferential rotation. The middle spacer is designed to work in conjunction with a bladeout bumper 400 on the disk rim that also allows up to 6 degrees of rotation away from the blade shank. The bladeout bumper 400 and the spacer undercut 340 are designed to contact at the same time and act in parallel to limit the rotation of the blade to 6 degrees.

Figure 10:
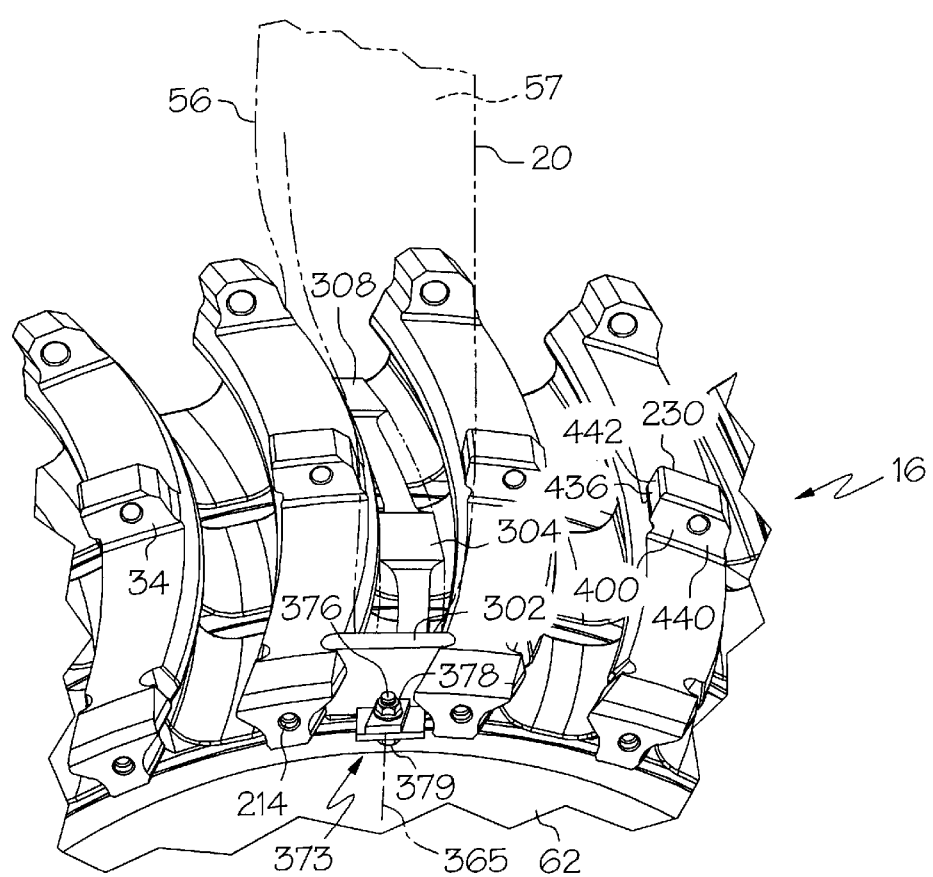
FIG. 10 is an enlarged perspective view illustration of a portion of the fan disk in FIG. 3.

In one embodiment, a void 330 around the spacer's backbone 300 and between the forward and aft dovetail lands 302 and 308 is filled with an elastomeric material 332 to provide a soft interference with the disk by surrounding the parent metal of the backbone spacer 290 with the elastomeric material as illustrated in FIGS. 13, 22, 23 and 24. With the void filled, the spacer has continuous axially extending curved edges 319 that smoothly arcs the curved normal to and about the radial axis RA. The filled void also provided the spacer with a constant shape and size cross-sectional area A between the forward and aft dovetail lands 302 and 308. This soft interference provides some anti-rotation capability for the blade by keeping the pressure faces in full contact. The forward, mid and aft dovetail lands 302, 304 and 308, respectively, are disposed along the backbone 300 such that the burst slots 70 are located between the forward, mid, and aft dovetail lands 302, 304, and 308 so that dovetail lands fully contact metal of the disk as illustrated in FIG. 10.

The spacer is provided to hold the blades radially outwardly and to prevent unwanted rotation and failure of trailing fan blades during a bladeout event when a released fan blade impacts a first trailing fan blade. The first trailing blade rotates circumferentially and, in the case of a circular arc dovetail, it causes a dovetail load up on point locations which jeopardized the integrity of the dovetail of the first trailing blade. The blade needs to be prevented from rotating too much and loading the corners up.

The spacer 290 is slid into the dovetail slot 52 between the dovetail slot bottom wall 292 and the root bottom surface 296 of the fan blade dovetail root 58 after the fan blade 20 and the two adjacent platforms have been on the rim 62 of the disk 16. Pairs of circumferentially oppositely facing retaining slots 352 are cut through the overhang 69 of circumferentially adjacent disk posts 50 at an axial location in an aftwardmost end of the overhang 69 where the overhang 69 of the disk post 50 begins to extend axially forward from the rim 62. The spacer 290 is slid aftwardly till the tab 320 clears the retaining slots 352. Afterwards, referring to FIG. 12, a retainer 350 is used to axially lock fan blade 20 in place.

Note that the spacer may also be straight for use in a straight dovetail slot. In such an embodiment, the backbone is straight and the forward, mid and aft dovetail lands would be axially straight and disposed axially along the backbone.

Figure 14:
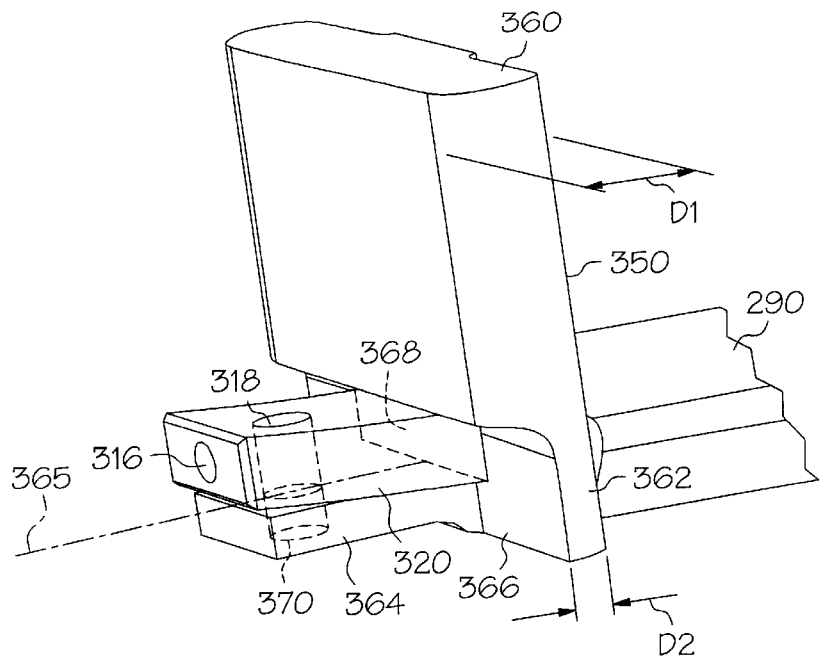
FIG. 14 is a perspective view illustration of a forward portion of the spacer in FIG. 13 engaged with a retainer in the fan disk in FIG. 1.
Figure 15:
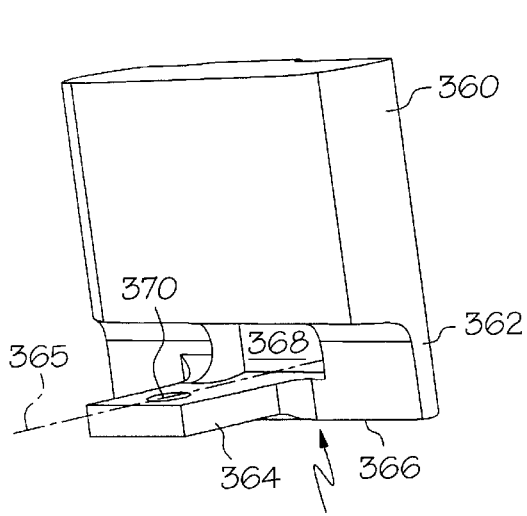
FIG. 15 is a forward looking aft perspective view illustration of the retainer in FIG. 14.
Figure 16:
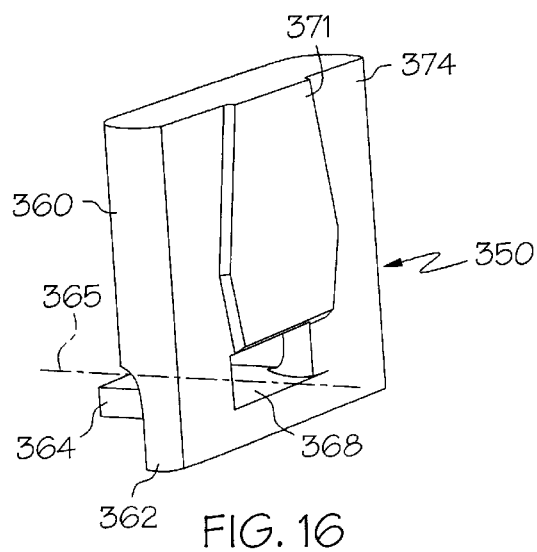
FIG. 16 is an aft looking forward perspective view illustration of the retainer in FIG. 14.
Figure 18:
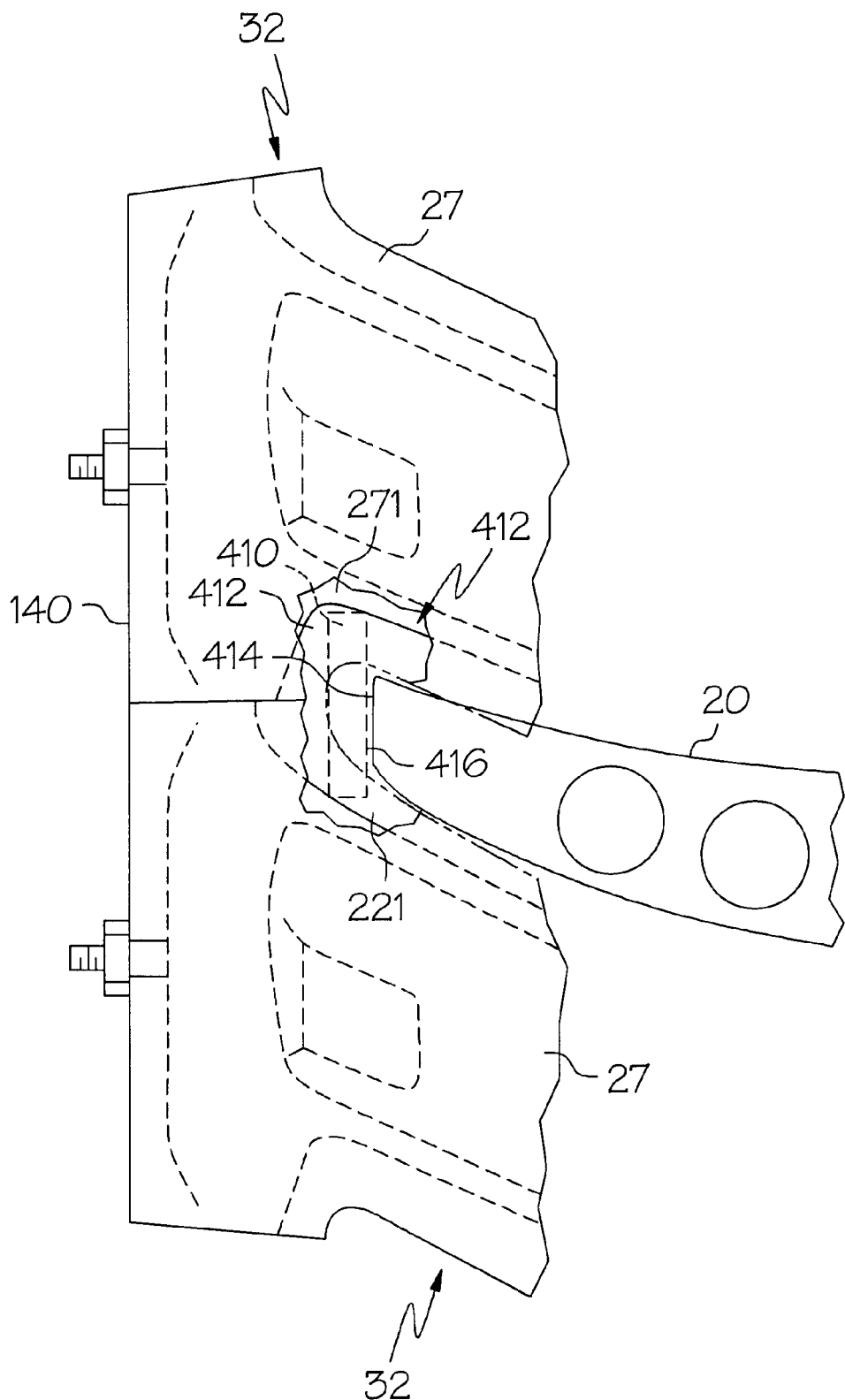
FIG. 18 is a radially inwardly looking sectional view illustration of the forward seal in FIG. 17.

Referring to FIGS. 14, 15 and 16, the retainer 350 is generally a monolithic block 360 having a block thickness D1 with a retainer wall 362 depending radially inwardly from the block and having a smaller retainer wall thickness D2. A rectangular shelf 364 normal to and extending axially forward of the retainer wall 362 is disposed along a radially inner edge 366 of the retainer wall. In the exemplary embodiment, the retainer slot 368 is rectangular and disposed through the retainer wall 362 between along the rectangular shelf 364. The retainer slot 368 has a shape and size to allow the spacer tab 320 to be slid through the slot. In the exemplary embodiment illustrated herein, the retainer slot 368 is arced or curved sideways and, in an alternative embodiment, is skewed with respect to a shelf centerline 365 extending axially down the middle of the shelf 364. The spacer tab 320 is also curved and, in an alternative embodiment, skewed with respect to the shelf centerline 365 as can be seen in FIG. 10. A radially extending shelf aperture 370 is disposed through the rectangular shelf 364 and located to align with the radially extending tab aperture 318. A raised retainer land 371 extends aftwardly off a retainer backside 374 of the retainer 350. The retainer land 372 has a shape designed to effectively contact an axially forward facing flat 414 along the dovetail root 58 as illustrated in FIGS. 17 and 18. Before the retainer 350 is installed, a forward seal 410 is installed between the blade 20, the forward stiffening ribs 271 and the platform, and trapped in place by the retainer 350. The forward seal 410 closes potential leak paths at the leading edge of the blade without introducing complications to platform side seals bonded to the pressure and suction side edges 262 and 264, respectively, of the platform 32.

After the spacer 290 is slid aftward in the dovetail slot 52, the retainer is raised from under the overhang 69 of the disk posts 50 into the circumferentially oppositely facing retaining slots 352. When the retainer 350 is in place in the retaining slots 352, it extends across the dovetail slot 52 axially retaining the fan blade dovetail root 58 in the dovetail slot 52. The spacer 290 is slid forward and the rectangular spacer tab 320 slides into the retainer slot 368. This can be accomplished using a tool that easily engages and disengages the spacer tab 320 through the axially extending tab aperture 316. The spacer tab 320 and the spacer 290 are positioned such that the shelf aperture 370 is aligned with the radially extending tab aperture 318. Then a spacer bolt 373 having a spacer bolt head 379 and a threaded spacer bolt shank 376 is inserted through the bottom of the shelf aperture 370 and upwards though the radially extending tab aperture 318. A spacer nut 378 is then threaded and tightened onto the spacer bolt shank 376 such that the spacer nut engages the spacer tab 320 and the spacer bolt head 379 engages the rectangular shelf 364.

Referring to FIGS. 26 and 27, platform side seals denoted and referred to herein as pressure and suction side angled seals 403 and 401, respectively, have flat seal bases 402 attached or bonded, such as with an epoxy, to and axially extending along the inner surface 236 of the platform 32. Pressure and suction side angled seals 403 and 401 are disposed between the aft and forward stiffening ribs 270 and 271 and the pressure and suction side edges 262 and 264, respectively. Angled seal legs 404 depend radially inwardly from the seal bases 402. The pressure and suction side angled seals 403 and 401 have a cross-section that changes along the axial length of the angled seals to conform to the shape of the fan blade 20 against which it seals.

Referring to FIGS. 17 and 18, before the retainer 350 is installed, a forward seal 410 is inserted in an annular space 412 formed between the blade 20, the forward stiffening ribs 271 of adjacent platforms 32, and the inner surface 236 of the adjacent platforms, the axially forward facing flat 414 along the dovetail root 58, and a rabbet 416 between the forward facing flat 414 and the leading edge LE of the airfoil section 56. The forward seals 410 in the exemplary embodiment are cylindrical in shape. Each of the forward seals 410 is inserted up through the retention slots 352 to rest between and seal against the blade 20, the forward stiffening ribs 271 of the pressure and suction side edges 262 and 264 of adjacent platforms 32, and the inner surfaces 236 of the adjacent platforms 32. Afterwards, the retainer 350 is installed. The forward seals 410 and the pressure and suction side angled seals 403 and 401 are made of silicon or some other elastomeric material.

An annular aft seal 430 is attached or bonded, such as with an epoxy, to the annular mounting plate 29. The aft seal 430, in the exemplary embodiment, has a circular cross-sectional shape such that the aft seal may be described as a hoop. The aft seal 430 is disposed along the annular mounting plate 29 and radially inwardly of the platforms 32 so as to seal a gap defined by the mounting plate, the trailing edge TE of the blade 20, and adjacent platforms around the blade.

Figure 11:
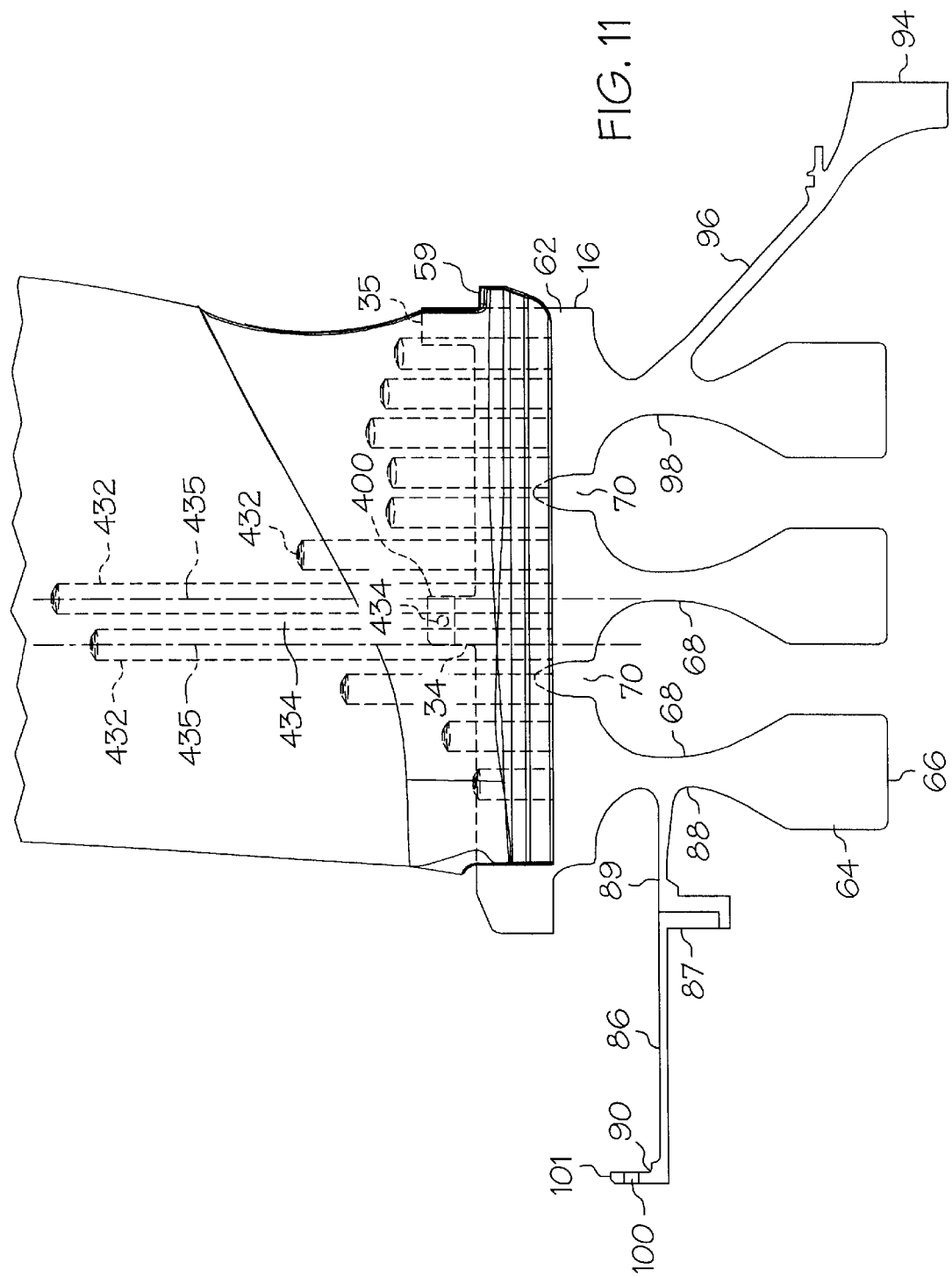
FIG. 11 is a cross-sectional view illustration of a lower portion of the fan blade with fan blade lightening holes mounted in the dovetail slot in the fan disk in FIG. 1.

Referring to FIGS. 2, 3, 9 and 10, the fan disk soft bladeout bumper 400 is disposed on the forward disk lug 34 to prevent a fan blade 20 released during a bladeout event from impacting an adjacent trailing fan blade. The bladeout bumper 400 includes a circumferentially extending appendage 440 on the forward disk lug 34 and extends toward the suction side 57 of the airfoil section 56 of the fan blade 20, illustrated in phantom in FIG. 10. The adjacent trailing fan blade rotates circumferentially and, for a fan blade with a circular arc dovetail root, the rotation causes the dovetail root to load up on point locations which jeopardize the integrity of the dovetail root. The blade needs to be prevented from rotating too much and loading the corners up. The bladeout bumper 400 is designed to work with a fan blade 20 that has fan blade lightening holes 432 such as illustrated in FIG. 11. The bladeout bumper 400 is located axially to ensure that the contact is made at an axial contact location 434 between the fan blade lightening holes 432 instead of at a fan blade lightening hole. To further ensure minimal loading, the bladeout bumper 400 is wider than previous similar bumpers and axially spans from a hole centerline 435 of one fan blade lightening hole 432 to the hole centerline of an adjacent fan blade lightening hole. The circumferentially extending appendage 440 includes a circumferentially facing bumper surface 442 that faces the suction side 57 and has a soft coating 436 made of a metallic material such as metallic thermal spray material. The soft coating 436 is designed to contact the fan blade 20 and the coating is made of a material softer than the material of the fan blade, thus, limiting damage to the blade. In the exemplary embodiment, the bumper surface 442 is contoured to the shape of the blade 20 at a location at the axial contact location 434.

Figure 7:
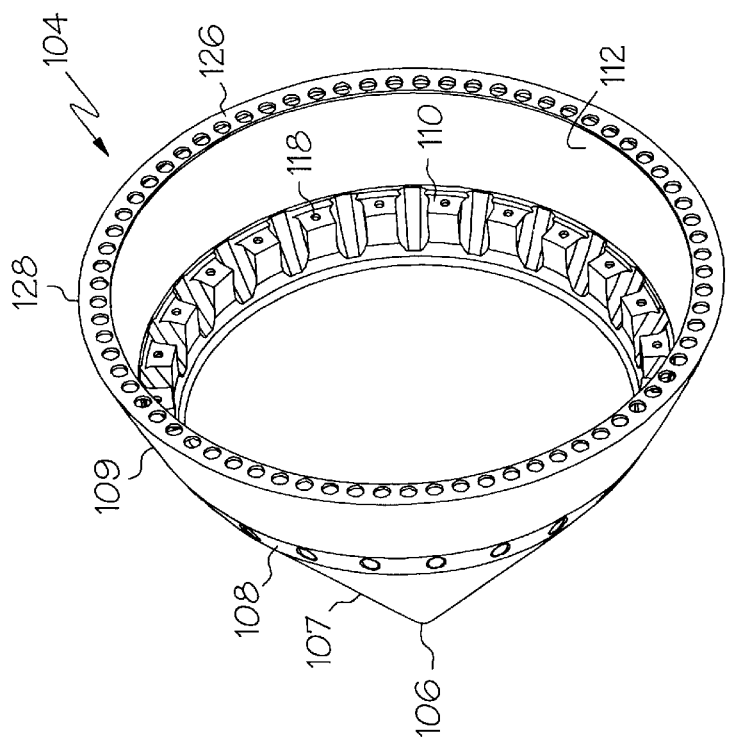
FIG. 7 is an aft looking forward perspective view illustration of the spinner of the f an rotor illustrated in FIG. 1.
Figure 6:
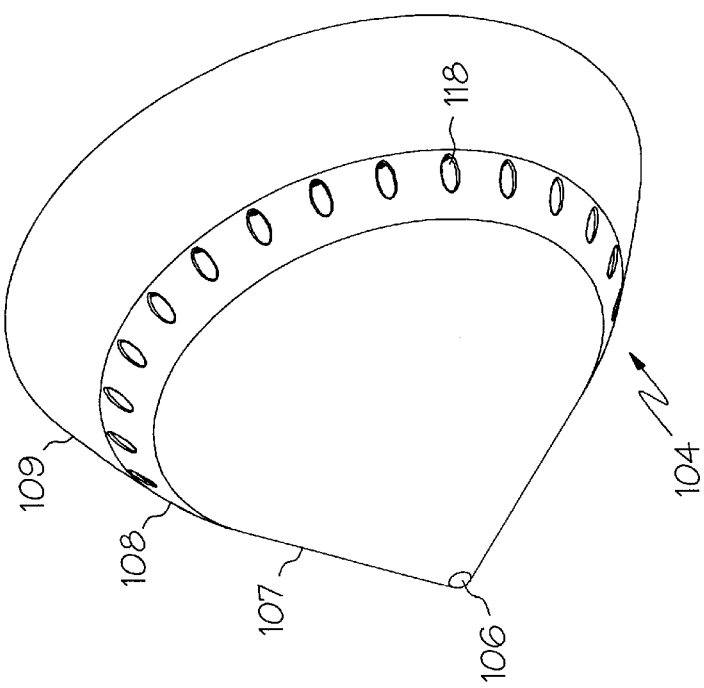
FIG. 6 is a forward looking aft perspective view illustration of a spinner of the fan rotor illustrated in FIG. 1.
Figure 8:
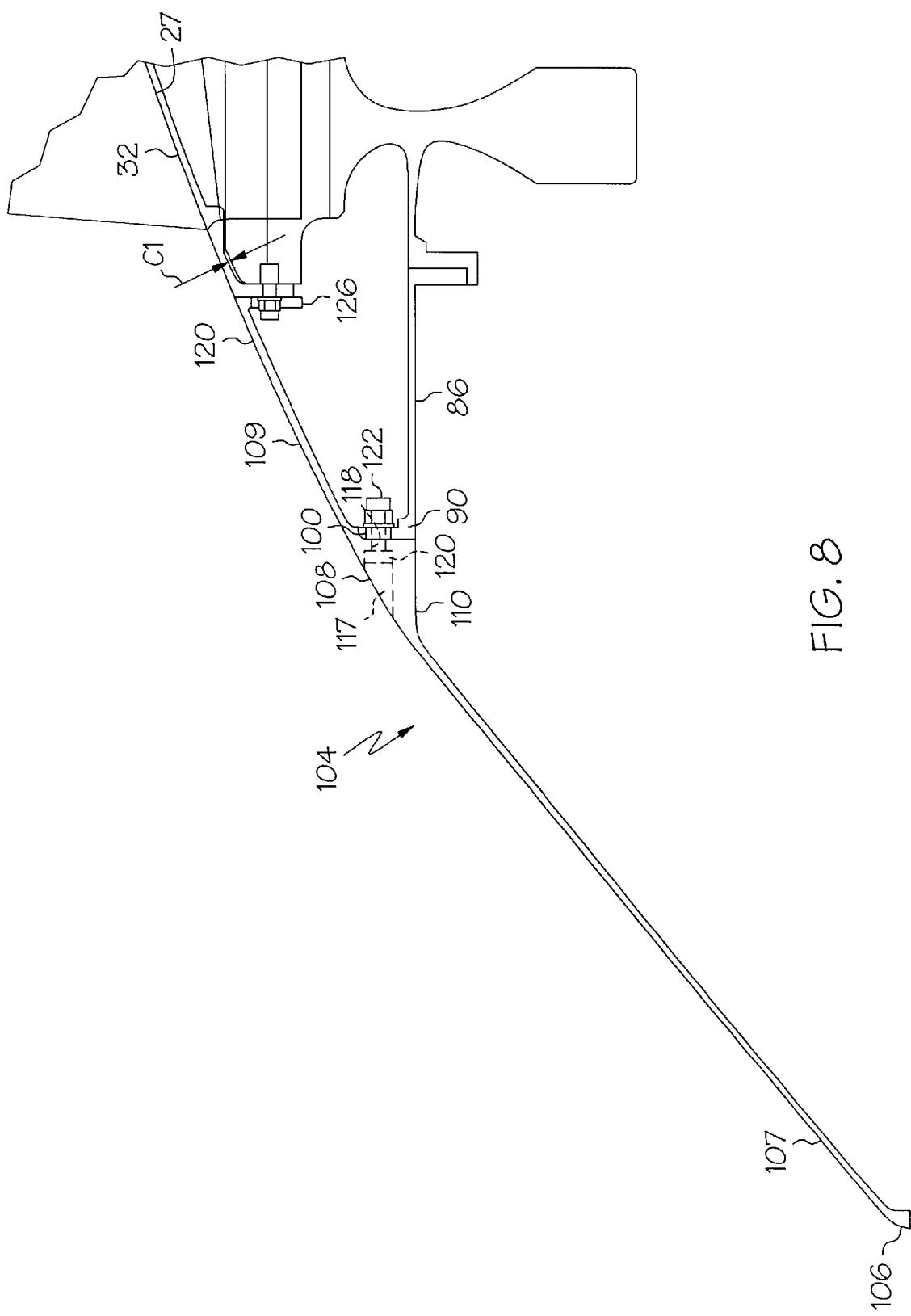
FIG. 8 is an enlarged cross-sectional view illustration of the spinner of the fan rotor illustrated in FIG. 1.

Referring to FIGS. 6, 7 and 8, the spinner 104 is attached to the forward flange 90 of the forward extension 86 and, thus, is connected to the disk 16. The spinner 104, as illustrated in the exemplary embodiment herein, has a hollow body with a substantially conical shape and is a single piece spinner. The spinner 104 has tip 106 from which a forward conical section 107 extends aftwardly to transition section 108. An aft conical section 109 extends aftwardly from the transition section 108. The forward and aft conical sections 107 and 109 have different cone angles. A plurality of bosses 110 are circumferentially distributed around an inner surface 112 of spinner 104 illustrated herein at an axial location generally corresponding to a location within the transition section 108 between the forward and aft conical sections 107 and 109 of the spinner. A plurality of boss counterbores 117 axially adjacent and forward of and co-axial with boss bolt holes 118 in the spinner 104. Each of the boss counterbores 117 and corresponding ones of the boss bolt holes 118 extend axially parallel to the centerline 11 through the spinner 104 and each of bosses 110. Spinner bolts 120 are disposed through bolt hole 118 and are threaded into spinner nuts 122 swaged into the forward bolt holes 100 in the annular forward flange 90 and secure the spinner 104 to the annular forward flange 90 and the disk 16. The spinner nuts 122 are shank nuts which provide anti-rotation of the nuts when swaged into the forward bolt holes.

An aft spinner flange 126 is attached to an axially aft spinner end 128 of the aft conical-section 109 of the spinner 104. A plurality of flange lightening holes 134 axially disposed through the aft spinner flange 126 are circumferentially distributed around the aft spinner flange. The flange lightening holes 134 are sized large enough with a large clearance to allow the threaded forward shank portions of the platform pins 220 to easily pass through the flange lightening holes when the spinner is mated and fastened to the forward flange 90 of the forward extension 86. The exemplary embodiment has more flange lightening holes 134 than platform pins 220. The spinner 104 is illustrated herein as having a bi-conical shape having the forward conical section 107 and the aft conical section 109 connected by the transition section 108. Other shapes are contemplated by the present invention.

The platform pins 220 in the post holes 214 provide radial retention for the forward portion of the platform. The forward mounting lugs 40 of the platform 32 are trapped between the forward facing circular rim surface 142 of the rim 62 and the aft spinner flange 126, thus, providing axial retention for the platform as a whole.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A non-integral gas turbine engine fan blade platform for circumferential disposition between fan blades, said platform comprising:

a platform wall with a radially outer surface which faces radially outwardly and a radially inner surface which faces radially inwardly, said platform wall is sloped with respect to a centerline with an increasing radius of the outer surface in the axially aft direction, forward, mid, and aft mounting lugs depend radially inwardly from said platform wall, and a wedge shaped platform bumper depends radially inwardly from the inner surface of the platform wall and is axially located forward of said mid mounting lug.

2. A platform as claimed in claim 1 further comprising circumferentially curved forward stiffening ribs extending axially from said mid mounting lug to a forward edge of the platform bumper about where said platform bumper begins to depend radially inwardly from said inner surface of said platform wall.

3. A platform as claimed in claim 2 wherein said forward stiffening ribs are tapered down to said inner surface of said platform such that at any axial location a first height of said forward stiffening ribs is less than a second height of said platform bumper along an axially extending bumper length.

4. A platform as claimed in claim 3 further comprising circumferentially curved aft stiffening ribs extending between said mid and aft mounting lugs.

5. A platform as claimed in claim 4 wherein said platform wall further comprises a rectangularly shaped forward portion and a circumferentially curved aft portion.

6. A platform as claimed in claim 5 wherein said circumferentially curved aft portion has pressure and suction side edges that have pressure and suction side airfoil shapes respectively.

7. A platform as claimed in claim 6 wherein:
said mid and aft mounting lugs have axially extending mid and aft holes respectively therethrough,
bushings are disposed within said mid and aft holes, and
said bushings are made of a harder material than that of said lugs.

8. A platform as claimed in claim 7 wherein said bushings are pressed into said holes with an interference on the order of 1.5–2.5 mils on diameter.

9. A gas turbine engine rotor assembly comprising:
a disk having a number of annular hubs circumscribed about a centerline,
each of said hubs connected to a disk rim by a web,
a plurality of circumferentially spaced apart circular arc dovetail slots disposed through said rim, extending circumferentially between disk posts, extending axially from a forward end to an aft end of said rim, and extending radially inwardly from a disk outer surface of said rim,
a plurality of fan blades having circular arc dovetail roots disposed in said circular arc dovetail slots,
non-integral gas turbine engine fan blade platforms mounted on said disk and circumferentially disposed between said fan blades,
each of said platforms comprising;
a platform wall with a radially outer surface which faces radially outwardly and a radially inner surface which faces radially inwardly,
said platform wall sloped with respect to a centerline with an increasing radius of the outer surface in the axially aft direction,
forward, mid, and aft mounting lugs depend radially inwardly from said platform wall, and
a wedge shaped platform bumper depends radially inwardly from the inner surface of the platform wall and is axially located forward of said mid mounting lug.

10. A gas turbine engine rotor assembly as claimed in claim 9 further comprising circumferentially curved forward stiffening ribs extending axially from said mid mounting lug to a forward edge of the platform bumper about where said platform bumper begins to depend radially inwardly from said inner surface of said platform wall.

11. A gas turbine engine rotor assembly as claimed in claim 10 wherein said forward stiffening ribs are tapered down to said inner surface of said platform such that at any axial location a first height of said forward stiffening ribs is less than a second height of said platform bumper along an axially extending bumper length.

12. A gas turbine engine rotor assembly as claimed in claim 11 further comprising circumferentially curved aft stiffening ribs extending between said mid and aft mounting lugs.

13. A gas turbine engine rotor assembly as claimed in claim 12 wherein said platform wall further comprises a rectangularly shaped forward portion and a circumferentially curved aft portion.

14. A gas turbine engine rotor assembly as claimed in claim 13 wherein said circumferentially curved aft portion has pressure and suction side edges that conform to shapes of pressure and suction sides of an airfoil section of said blades and are contoured to fit around said airfoil section between airfoil leading and trailing edges, respectively.

15. A gas turbine engine rotor assembly as claimed in claim 14 wherein:
said mid and aft mounting lugs have axially extending mid and aft holes respectively therethrough,
bushings are disposed within said mid and aft holes, and
said bushings are made of a harder material than that of said lugs.

16. A gas turbine engine rotor assembly as claimed in claim 15 wherein said bushings are pressed into said holes with an interference on the order of 1.5–2.5 mils on diameter.

17. A gas turbine engine rotor assembly as claimed in claim 15 further comprising:
forward and aft ends of said platforms,
said aft mounting lugs located at said aft ends and said mid mounting lugs located between said forward and aft ends,
forward and aft disk lugs extending radially outwardly from said posts, and
axially extending forward pins mounted on said forward disk lugs and disposed through bushings in corresponding ones of said mid holes of said mid mounting lugs of said platform
forward mounting lugs located at said forward ends and depending radially inwardly from said platforms,
aftwardly extending platform pins secured to corresponding ones of said forward mounting lugs,
post holes extending axially aftwardly into a circular rim surface of said rim, and
said platform pins disposed in corresponding ones of said post holes.

18. An assembly as claimed in claim 17 further comprising:
web channels disposed axially between said webs and radially between said rim and said hubs,
said web channels having maximum widths extending axially between said webs and channel lengths extending radially between said rim and said hubs wherein said maximum widths and said the channel lengths are on the same order of magnitude, and
circumferentially extending annular burst slots extending radially through said rim into said dovetail slots between each adjacent pair of said webs.

19. An assembly as claimed in claim 18 further comprising a booster spool connected to said rotor disk and axially forwardly extending aft pins connected to said booster spool and disposed in corresponding ones of said aft holes in said aft mounting lugs.

20. An assembly as claimed in claim 17 wherein said post holes extend into a corresponding ones of said posts.

21. An assembly as claimed in claim 20 wherein said web channels have radially inner fillets extending radially outwardly from said hubs towards said rim in a range of about 30–70 percent of said channel length.

22. An assembly as claimed in claim 20 further comprising:

an annular forward extension having an annular forward flange and connected to an annular forward arm extending forwardly from a forward most one of said webs, a spinner attached to a forward flange of said forward extension, said spinner is attached to said forward flange at a location between a tip and an axially aft spinner end of said spinner, and said forward mounting lugs of said platform are trapped between said forward facing circular rim surface of said rim and said aft spinner flange.

23. An assembly as claimed in claim 17 further comprising cylindrical annular forward seals disposed in annular spaces between said blades, said forward stiffening ribs and inner surfaces of adjacent ones of said platforms, and axially forward facing flats along said dovetail roots.

24. An assembly as claimed in claim 23 further comprising a cylindrical annular aft seal bonded to said annular mounting plate radially inwardly of said the platform positioned to seal a gap defined by said mounting plate, said trailing edges of said blades, and said adjacent platforms.

* * * * *